(12) United States Patent
Terasawa

(10) Patent No.: US 7,120,291 B1
(45) Date of Patent: Oct. 10, 2006

(54) METHOD AND APPARATUS FOR ANALYZING INPUT INFORMATION

(76) Inventor: Takafumi Terasawa, 1-3-RB-304, Tsushimanaka, Okayama-shi, Okayama-ken (JP)

( * ) Notice: Subject to any disclaimer, the term of this patent is extended or adjusted under 35 U.S.C. 154(b) by 915 days.

(21) Appl. No.: 09/707,599

(22) Filed: Nov. 7, 2000

(30) Foreign Application Priority Data

Nov. 8, 1999 (JP) .............................. 11-317484

(51) Int. Cl.
- G06K 9/62 (2006.01)
- G06F 15/18 (2006.01)
- G06N 5/02 (2006.01)

(52) U.S. Cl. .................... 382/155; 382/181; 382/224; 706/18; 706/20; 706/48

(58) Field of Classification Search ............... 382/161, 382/179, 229, 248, 156, 155, 159, 181, 205, 382/209, 218, 219, 224, 225; 703/1, 2; 706/16, 706/15, 18, 20, 47, 48, 54

See application file for complete search history.

(56) References Cited

U.S. PATENT DOCUMENTS

| | | | | |
|---|---|---|---|---|
| 5,038,390 A | * | 8/1991 | Ravi Chandran | 382/248 |
| 5,063,608 A | * | 11/1991 | Siegel | 382/239 |
| 5,136,687 A | * | 8/1992 | Edelman et al. | 706/20 |
| 5,283,839 A | * | 2/1994 | Edelman et al. | 382/103 |
| 5,349,541 A | * | 9/1994 | Alexandro et al. | 703/18 |
| 5,530,886 A | * | 6/1996 | Kojima et al. | 706/42 |
| 5,568,571 A | * | 10/1996 | Willis et al. | 382/254 |
| 5,649,061 A | * | 7/1997 | Smyth | 706/16 |
| 5,802,220 A | * | 9/1998 | Black et al. | 382/276 |
| 6,363,369 B1 | * | 3/2002 | Liaw et al. | 706/15 |
| 6,424,961 B1 | * | 7/2002 | Ayala | 706/25 |
| 6,905,823 B1 | * | 6/2005 | Kallioniemi et al. | 435/6 |
| 2003/0228054 A1 | * | 12/2003 | Deco | 382/156 |

OTHER PUBLICATIONS

Ghosh et al., "A temporal memory network with state-dependent thresholds", IEEE, 1993.*

* cited by examiner

*Primary Examiner*—Leo Picard
*Assistant Examiner*—Sean Shechtman
(74) *Attorney, Agent, or Firm*—Brenda O. Holmes; Kilpatrick Stockton LLP

(57) ABSTRACT

A method and an apparatus operate like a human neural network to analyze and store input information and form patterns according to the input and stored information. The apparatus has a preprocessing unit (3), an activity computation unit (5), a mutual repression unit (6), and a composition unit (7). The apparatus receives an input pattern, calculates the similarity and activity levels of each stored pattern with respect to the input pattern, and repeats a predetermined number of times the activity calculation of each stored pattern according to the calculated activity level (A(i)), a negative repression coefficient, and the activity levels of the other stored patterns. The apparatus applies final activity levels to cell values of the stored patterns, totals the cell values through the stored patterns, and generates a new pattern according to the totaled cell values.

7 Claims, 18 Drawing Sheets

EXAMPLES OF SIMILARITY LEVELS

FIG.11
(a) 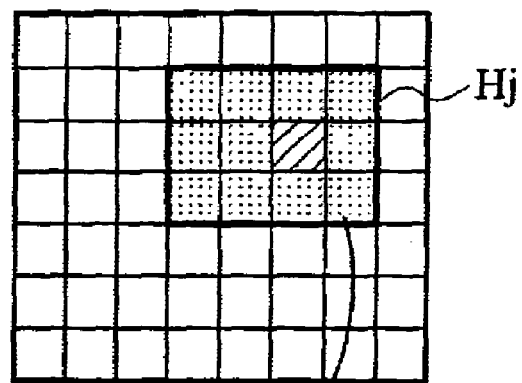
MUTUAL SIMILARITY REPRESSION
(b) 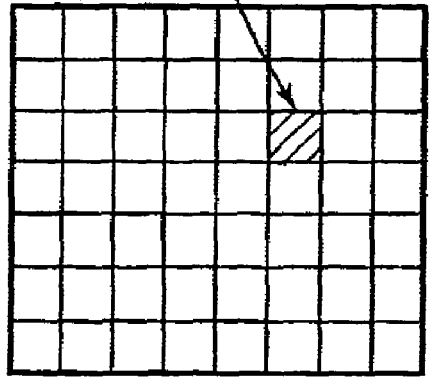

| | |
|---|---|
| ▨ | INPUT PATTERN |
| ○ | MAN ELEMENT |
| ⃝ (dashed) | INACTIVATED MAN ELEMENT |
| ⊘ | ACTIVATED MAN ELEMENT |
| → | ACTIVATION |
| ⊣ | MUTUAL REPRESSION |
| — | CONNECTION BETWEEN MAN ELEMENTS |
| Da,Db | INACTIVATION CONDITIONS OF ELEMENT 10X |

METHOD AND APPARATUS FOR ANALYZING INPUT INFORMATION

BACKGROUND OF THE INVENTION

1. Field of the Invention

The present invention relates to an input information analyzing method that receives an input pattern, stores the input pattern, analyzes the input pattern based on previously stored patterns through processes that model human sensibility, thinking, and intuition, and provides a resultant pattern. The present invention also relates to an apparatus for achieving the method.

2. Description of the Related Art

There are some computers that model human neural networks to process information. Such computers store molds or characteristics of letters such as a letter of "2" to recognize handwritten characters. When a handwritten "2" is entered, the computers find similarity between the handwritten "2" and the stored data and recognize the handwritten character as "2" if satisfactory similarity is found. To achieve human-like processes, the computers store codes or symbols representing various types of information in advance, and when information is entered for recognition, retrieve most likely information from the stored data as a recognized result.

This technique must convert many pieces of information into symbols in advance, store the symbols, and retrieve a suitable one from the stored symbols whenever information is entered for recognition. Namely, this technique is capable of handling only information that is encodable into symbols.

Humans are able to recognize even information that is not encodable. The prior art, however, is capable of handling only encodable information, and therefore, the prior is not the true realization of a human neural network.

SUMMARY OF THE INVENTION

An object of the present invention is to provide a method of and an apparatus for storing, analyzing, and providing information through a mechanism that assimilates a human neural network. In order to accomplish the object, the present invention provides an information analyzing method. The method receives an input pattern, finds an activity level for each stored pattern based on the input pattern, represses the activity levels by repression coefficients, and repeats the repression a given number of times.

When receiving an input pattern, the method finds a similarity level for each stored pattern with respect to the input pattern and calculates a correlation strength or an activity level for the stored pattern according to the similarity level.

The method uses the activity level of each stored pattern, a negative repression coefficient, and the activity levels of the other stored patterns, to calculate a new activity level for the stored pattern in question. This calculation of a new activity level for each stored pattern is repeated a given number of times. A final activity level calculated for each stored pattern is applied to each cell of the pattern, to determine cell values of the pattern. The cell values are summed up through the stored patterns, to provide cell values that form a new pattern representing the input and stored patterns.

The method of the present invention may provide an input pattern with a temporal depth to form a set of new input patterns. The new input patterns are supplied to a network of elements that are arranged at given intervals and have each a refractory period. In response to the input patterns, the elements form routes representing response rules for the input patterns.

Upon receiving an input pattern, the method finds a similarity level for each stored pattern and calculates a correlation strength or an activity level for the stored pattern according to the similarity level. The method uses the activity level of each stored pattern, a negative repression coefficient, and the activity levels of the other stored patterns, to calculate a suppressed activity level for the stored pattern in question. This operation is repeated a given number of times. A final activity level thus calculated for each stored pattern is applied to each cell of the pattern, to determine cell values of the pattern. The cell values are summed up through all stored patterns, to provide cell values that form a new pattern representing the input and stored patterns.

BRIEF DESCRIPTION OF THE DRAWINGS

FIG. 11 shows a method of processing an input pattern according to a second embodiment of the present invention;

DESCRIPTION OF THE PREFERRED EMBODIMENTS

An information analyzing method of the present invention analyzes input information as well as stored information (such as handwritten patterns) and composes new information according to the analysis result, unlike the prior art that compares input information with stored information such as character symbols, and retrieves suitable information from the stored information according to the comparison result.

Instead of conventionally analyzing input information, the present invention carries out mutual repression and composition when recognizing input information.

General Repression Method (UZUME)

Figure 1:
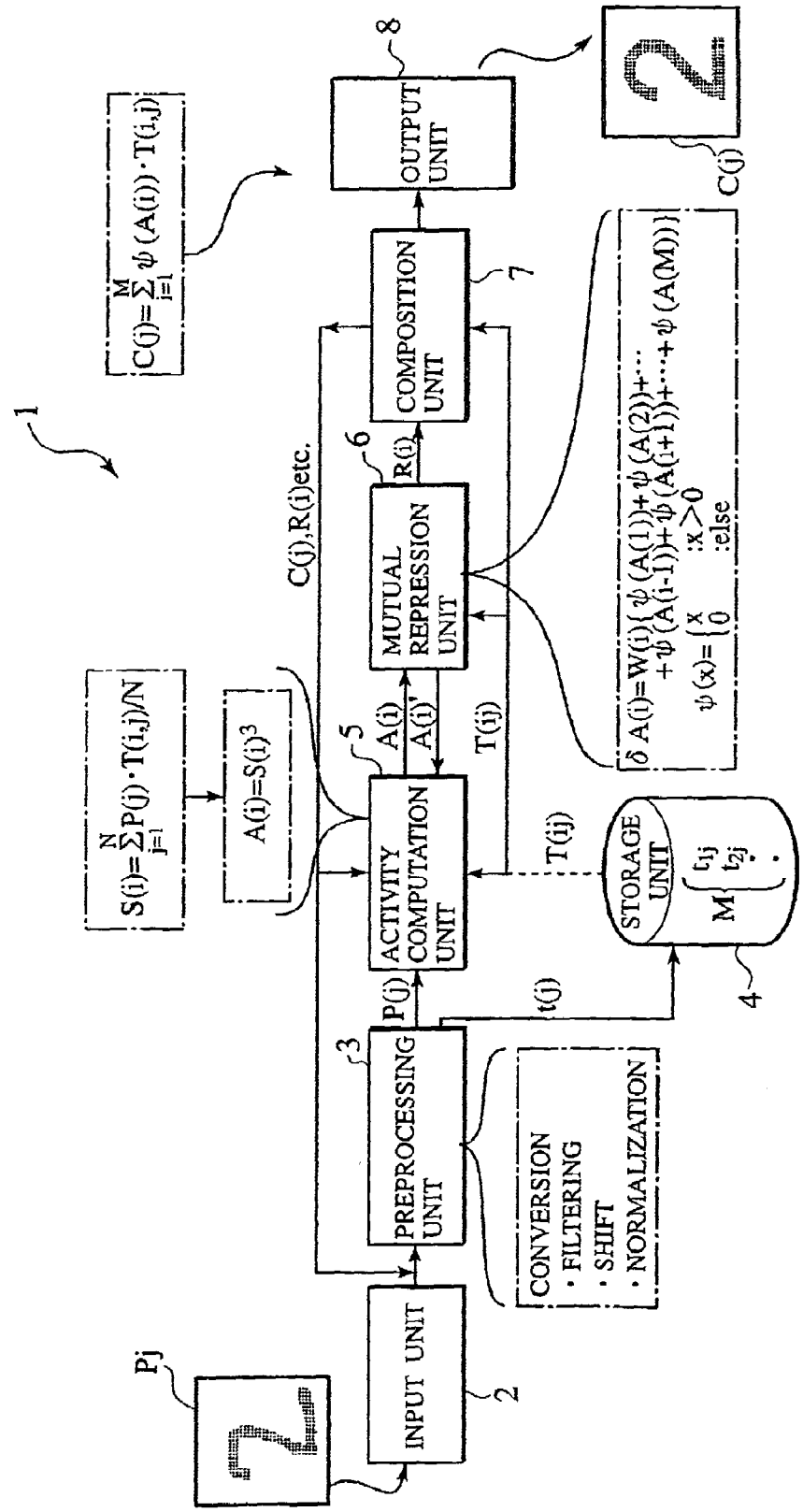
FIG. 1 schematically shows an apparatus for analyzing input information according to a first embodiment of the present invention.

A general repression method according to the present invention is referred to as UZUME. A first embodiment of the present invention is based on UZUME and handles input information such as handwritten characters entered with a mouse. FIG. 1 schematically shows an analyzer according to the first embodiment. The analyzer 1 has an input unit 2 that receives an image pattern $P_I(j)$ to process. The pattern $P_I(j)$ or a pattern from a pattern/scalar composition unit 7, which provides a composed pattern or scalar, is preprocessed in a preprocessing unit 3. The output of the preprocessing unit 3 is stored as a trace t(j) in a storage unit 4. According to information P(j) from the preprocessing unit 3, an activity computation unit 5 calculates a similarity level S(i) for each trace T(i, j) stored in the storage unit 4. According to the calculated similarity level S(i), the activity computation unit 5 calculates an activity level A(i) for each trace T(i, j). A mutual repression unit 6 represses the activity level A(i) of each trace T(i, j). The details of the repression will be described later. The composition unit 7 composes a pattern C(j) or a scalar according to outputs R(i) from the mutual repression unit 6 and the traces T(i, j) from the storage unit 4. The pattern C(j) is supplied to an output unit 8 which provides a pattern or scalar.

Figure 2:
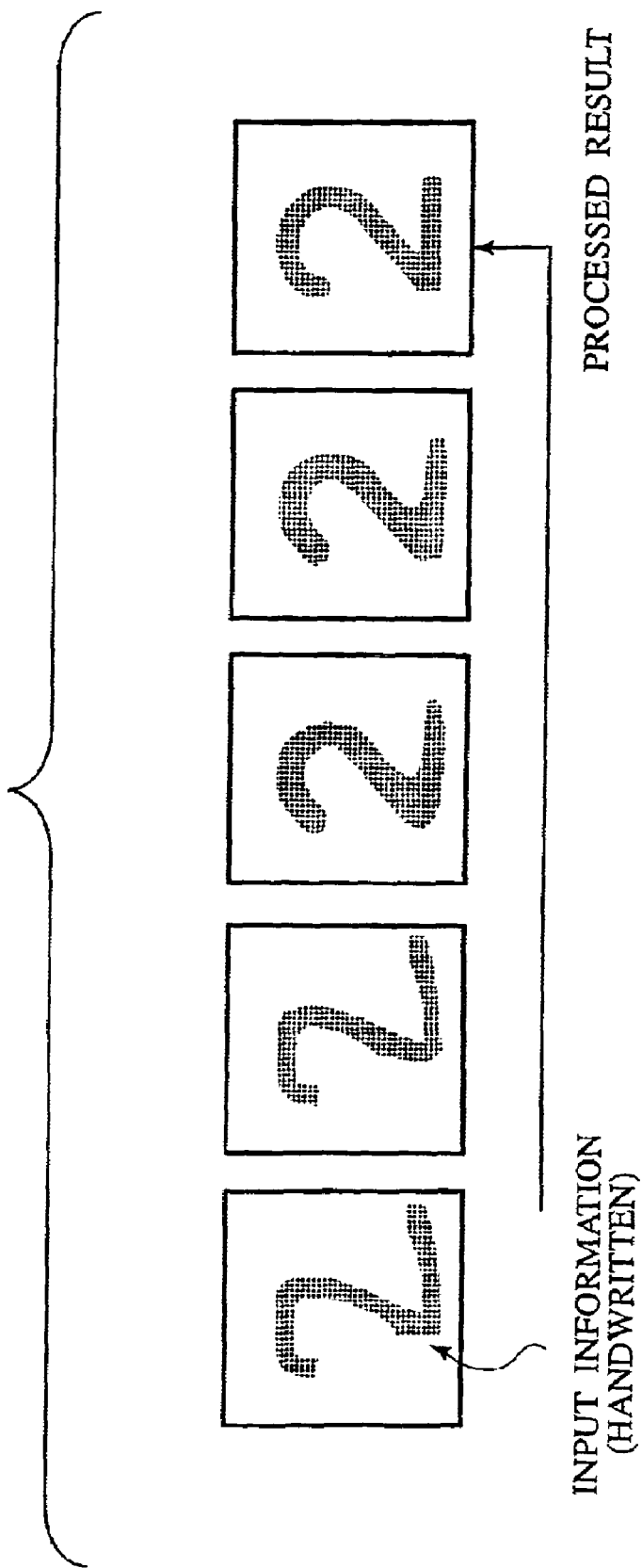
FIG. 2 explains a concept of the first embodiment.

The pattern C(j) may be fed back to the preprocessing unit 3 or the activity computation unit 5. In this way, the analyzer 1 receives handwritten information as shown in FIG. 2, calculates, based on the received information, activity levels for all traces stored in the storage unit 4, represses the calculated activity levels, and composes a pattern according to the repressed activity levels and the traces read out of the storage unit 4. The composed pattern representing an image of "2" in FIG. 2 is newly created information that is not stored in the storage unit 4.

An input pattern captured by the input unit 2 may be a character made of dots and may be written in a display memory through a mouse. Mouse movement is captured in, for example, 64×32 cells each representing "1" or "0" to form an input pattern $P_I(j)$.

The preprocessing unit 3 preprocesses the input pattern $P_I(j)$ with a two-dimensional Gaussian filter, shifts cell values of the input pattern $P_I(j)$ to zero the sum of the cell values, and normalizes the cell values in the range of −1.0 to +1.0. The preprocessing unit 3 provides a converted input pattern $P_C(j)$, which is stored as a trace t(j) in the storage unit 4. In this embodiment, the storage unit 4 is storing M traces T(i, j; i=1 to M).

Upon receiving the pattern $P_C(j)$ from the preprocessing unit 3, the activity computation unit 5 reads each trace T(i, j) from the storage unit 4 and calculates a similarity level S(i) for the trace T(i, j) according to the pattern $P_C(j)$ as follows:

$$S(i) = \sum_{j=1}^{N} P(j) \cdot T(i, j)/N,$$ (eq. 1)

where N is the number of cells each having an absolute value exceeding a threshold value in the pattern $P_C(j)$ and trace T(i, j), or only in the trace T(i, j).

According to each similarity level S(i) thus calculated, the activity computation unit 5 calculates an activity level A(i) for each trace T(i, j) as follows:

$$A(i)S(i)^3.$$ (eq.2)

Although this embodiment employs an exponent of 3, any other value is employable as an exponent. The activity computation unit 5 may directly receive a pattern C(j) from the composition unit 7, carry out AND, OR, or other operations between the patterns C(j) and $P_C(j)$ to provide a new input pattern $P_C(j)$, and calculate activity levels for the traces T(i, j) according to the new input pattern $P_C(j)$.

The mutual repression unit 6 receives the activity levels A(i) from the activity computation unit 5 and represses them. Namely, after the activity levels A(i) are settled, the mutual repression unit 6 changes each activity level A(i) by $\delta A(i)$ to provide $R(i)=A(i)+\delta A(i)$ as follows:

$$\delta A(i) = W(i)\{\psi(A(1)) + \psi(A)2)) + \ldots + \psi(A(i-1)) + \psi(A(i+1)) + \ldots + \psi(A(M))\},$$ (eq. 3)

$$\psi(x) = \begin{cases} x & : x > 0 \\ 0 & : \text{else,} \end{cases}$$ (eq. 4)

where $\Psi(x)$ is x if x is a positive value and is zero if x is null or a negative value. This embodiment employs a repression coefficient W(i) of −0.1. $\delta A(i)$ may be calculated in consideration of A(i). In each trace T(i, j), each cell value is multiplied by a corresponding suppressed activity level R(i), to provide new cell values for the trace T(i, j).

It is possible to specify a focal range in both input pattern and traces and then carry out the activity and mutual repression computation for cells in a similarity range and a repression range respectively. The similarity range is set in each of the input pattern and traces and is defined by a distance from the focal range. The mutual repression may be carried out on cells in the repression range. In this case, the repression coefficient may be weakened in proportion to the distance from the focal range. Results of the activity level calculation and repression are applied to the cells in the focal range. The distance that defines the similarity range is not always limited to a physical or spatial distance.

The composition unit 7 composes a new pattern from the suppressed activity levels R(i) and traces T(i, j) as follows:

$$C(j) = \sum_{i=1}^{M} \psi(A(i)) \cdot T(i, j).$$ (eq. 5)

The composition unit 7 may compose a new pattern as follows:

$$C(j) = \sum_{i=1}^{M} i\psi(A(i)) \cdot T(i, j)$$ (eq. 6a)

$$C(j) = \sum_{i=1}^{M} iA(i) \cdot \psi(T(i, j)).$$ (eq. 6b)

The details of the first embodiment will be explained with typical values. For the sake of clear understanding, each pattern is represented with three cells. In FIG. 3(a), the preprocessing unit 3 preprocesses an input pattern $P_I(j; j=1, 2, 3, ...)$ and provides a preprocessed pattern $P_C(j)$. Namely, the preprocessing unit 3 converts the pattern $P_I(j)$ having cell values of $\{0, 1, 0, ...\}$ into the pattern $P_C(j)$ having cell values of $\{0.2, 0.8, 0.2, ...\}$.

Figure 3:
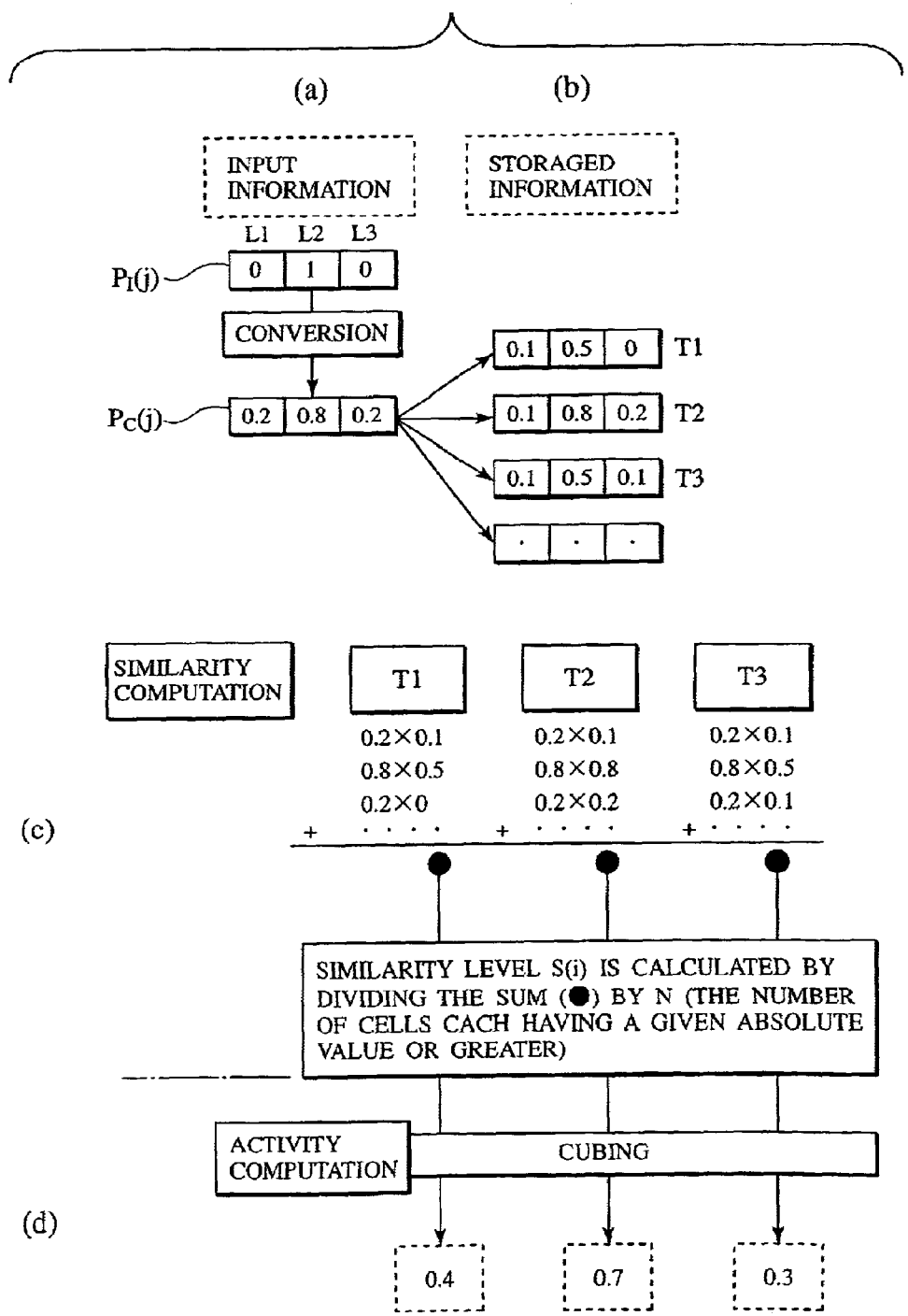
FIGS. 3 and 4 show exemplary operation of the first embodiment.

The activity computation unit 5 calculates similarity levels $S(i)$ for traces $T(i, j; i=1, 2, 3, ...)$ stored in the storage unit 4 with respect to the pattern $P_C(j)$. In FIG. 3(*b*), the traces $T(i, j)$ are $T1\{0.1, 0.5, 0, ...\}$, $T2\{0.1, 0.8, 0.2, ...\}$, $T3\{0.1, 0.5, 0.1, ...\}$, and the like.

In FIG. 3(*c*), each cell value of each trace $T(i, j)$ is multiplied by a corresponding cell value of the pattern $P_C(j)$, and the products are totaled. The total is divided by N (the number of cells each having an absolute value that is greater than a threshold), to provide a similarity level $S(i)$ for the trace $T(i, j)$ in question.

In FIG. 3(*d*), each similarity level $S(i)$ is cubed according to Equation 2, to provide an activity level $A(i)$. In this way, the activity level $A(i)$ of each trace $T(i, j)$ is calculated according to the pattern $P_C(j)$. In FIG. 3(*d*), the traces T1, T2, and T3 have activity levels of 0.4, 0.7, and 0.3, respectively.

The mutual repression unit 6 multiplies the calculated activity levels $A(i)$ (first activity levels) by a repression coefficient $W_i$. The repression coefficient $W_i$ is a negative value, is determined in advance, and is −0.1 in this embodiment.

Figure 4:
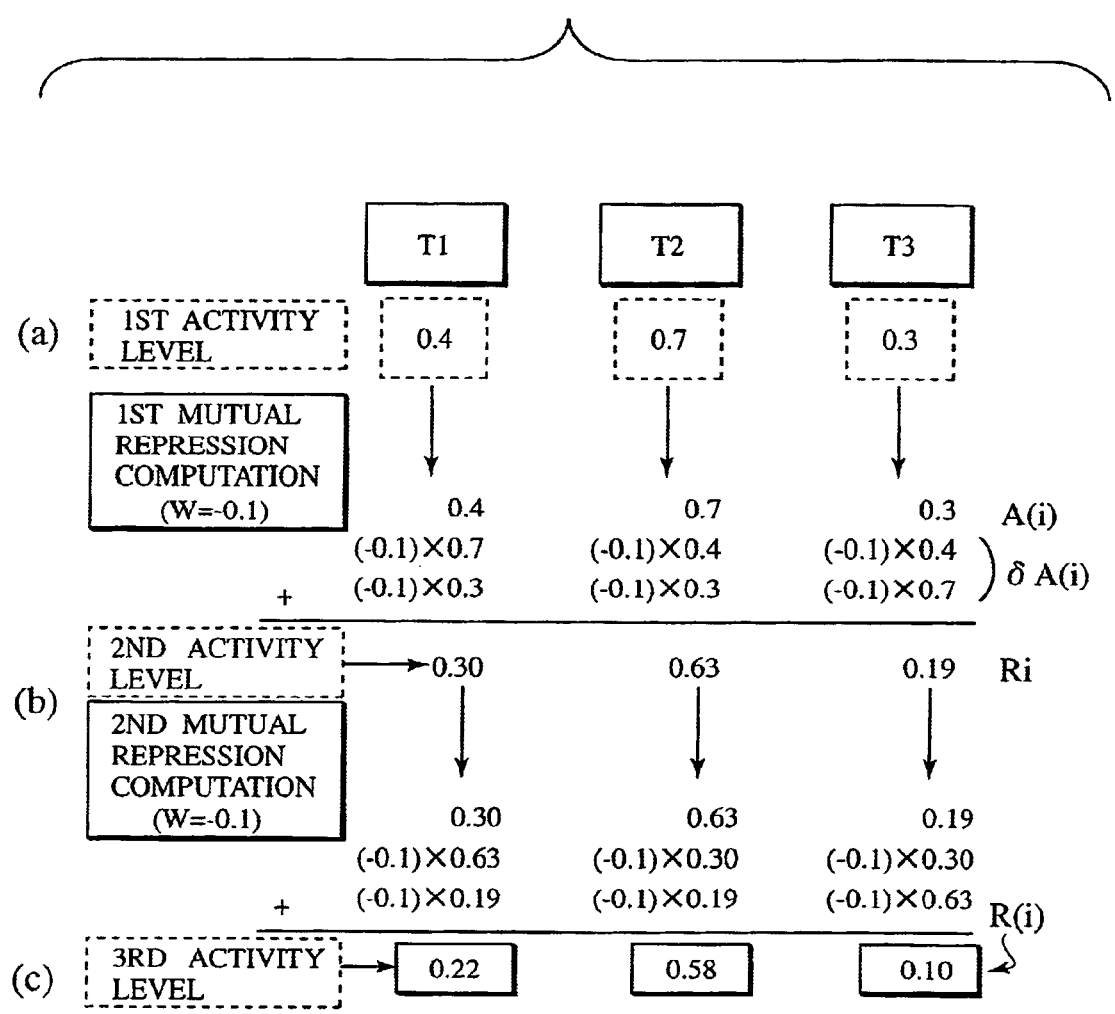

In FIG. 4(*a*), the mutual repression unit 6 multiplies the activity levels of peripheral traces around a given trace by the repression coefficient $W_i$ without multiplying the activity level of the given trace. For example, for the trace T1, the mutual repression unit 6 multiplies the activity levels of 0.7 and 0.3 of the traces T2 and T3 by the repression coefficient $W_i$ without multiplying the activity level of 0.4 of the trace T1 by the repression coefficient $W_i$. As a result, $\delta A(1)$ and $R(1)$ are calculated for the trace T1.

In FIG. 4(*b*), the calculated products $R(i)$ serve as second activity levels. Namely, the traces T1, T2, and T3 have the second activity levels of 0.30, 0.63, and 0.19, respectively. The second activity levels are again repressed by the mutual repression unit 6 so that the traces T1, T2, and T3 may have third activity levels 0.22, 0.58, and 0.10, respectively, as shown in FIG. 4(*c*).

Figure 5:
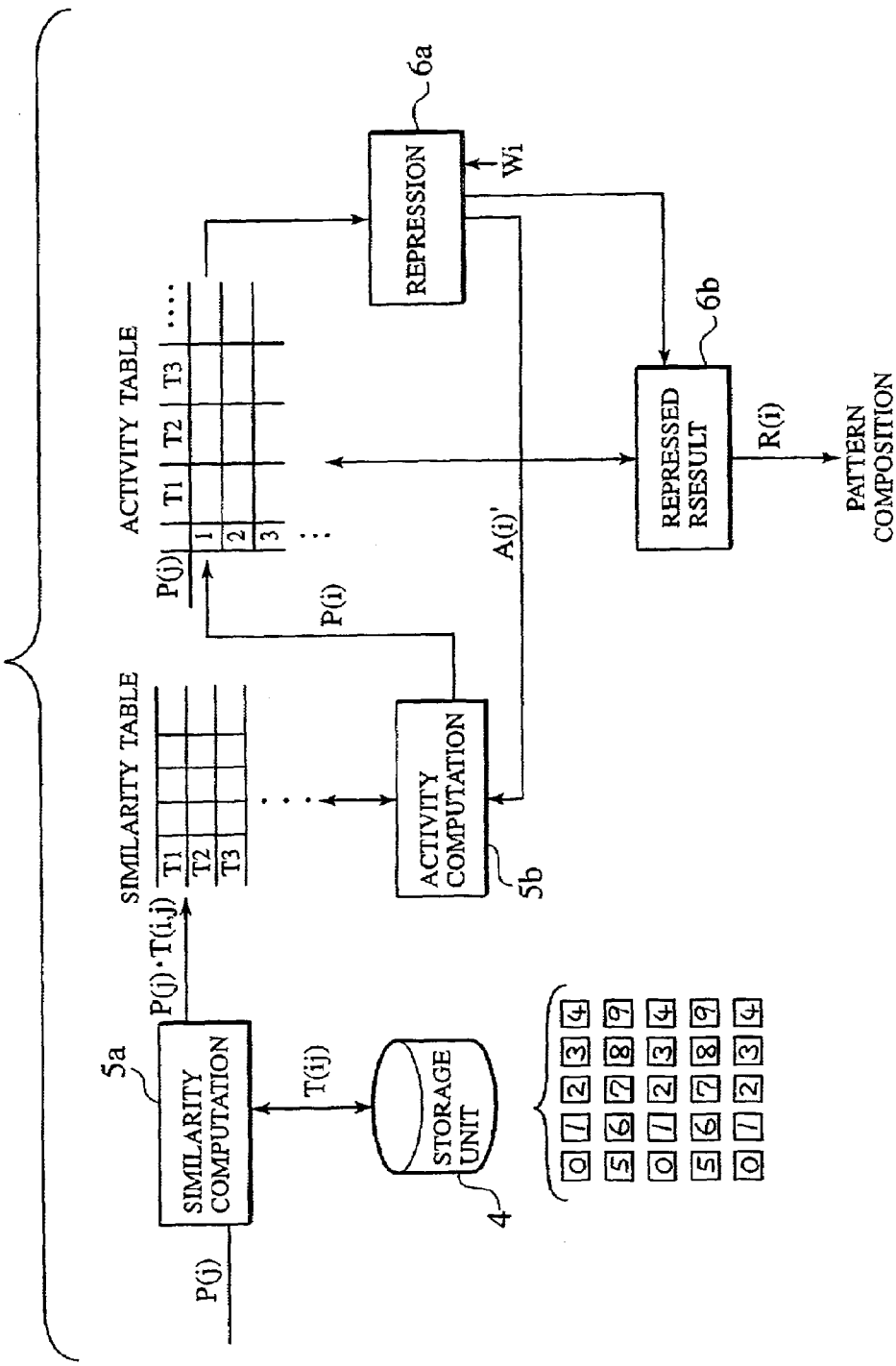
FIG. 5 shows the details of an activity computation unit and a mutual repression unit according to the first embodiment.
Figure 6:
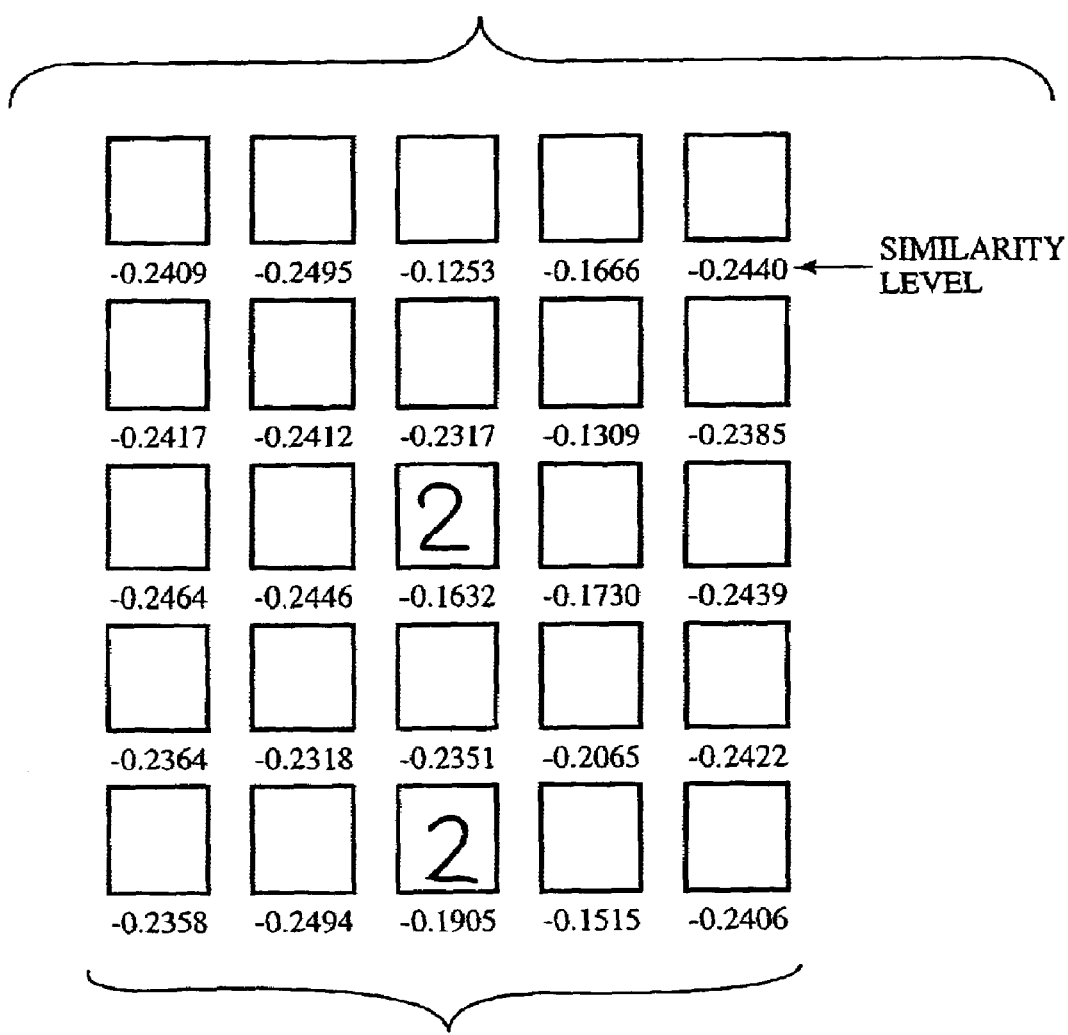
FIG. 6 shows an example of a similarity table.

FIG. 5 shows a flow of the above-mentioned processes. Upon receiving an input pattern $P_C(j)$, a similarity computation process 5*a* reads traces $T(i, j)$ from the storage unit 4, calculates similarity levels $S(i)$ for the traces $T(i, j)$ according to Equation 1, and stores the calculated similarity levels in a similarity table. The similarity table relates the similarity levels to the traces. FIG. 6 shows examples of similarity levels calculated for traces.

An activity process 5*b* calculates first activity levels for the traces $T(i, j)$, respectively, according to Equation 2 based on the calculated similarity levels and stores the calculated activity levels in an activity table.

A repression process 6*a* multiplies the first activity levels by a repression coefficient $W_i$ according to Equation 3, to provide the activity process 5*b* with the products $A'(i)$. The activity process 5*b* stores the products $A'(i)$ as new activity levels $A(i)$ in the activity table.

The above processes are repeated a predetermined number of times, and a repression output process 6*b* provides the composition unit 7 with the last activity levels $A(i)$ as resultant activity levels $R(i)$ for the traces $T(i, j)$.

The composition unit 7 reads the traces $T(i, j)$ from the storage unit 4, multiplies each cell value of each trace $T(i, j)$ by a corresponding one of the activity levels $R(i)$, and sums up the products cell by cell to create a new pattern.

Figure 7:
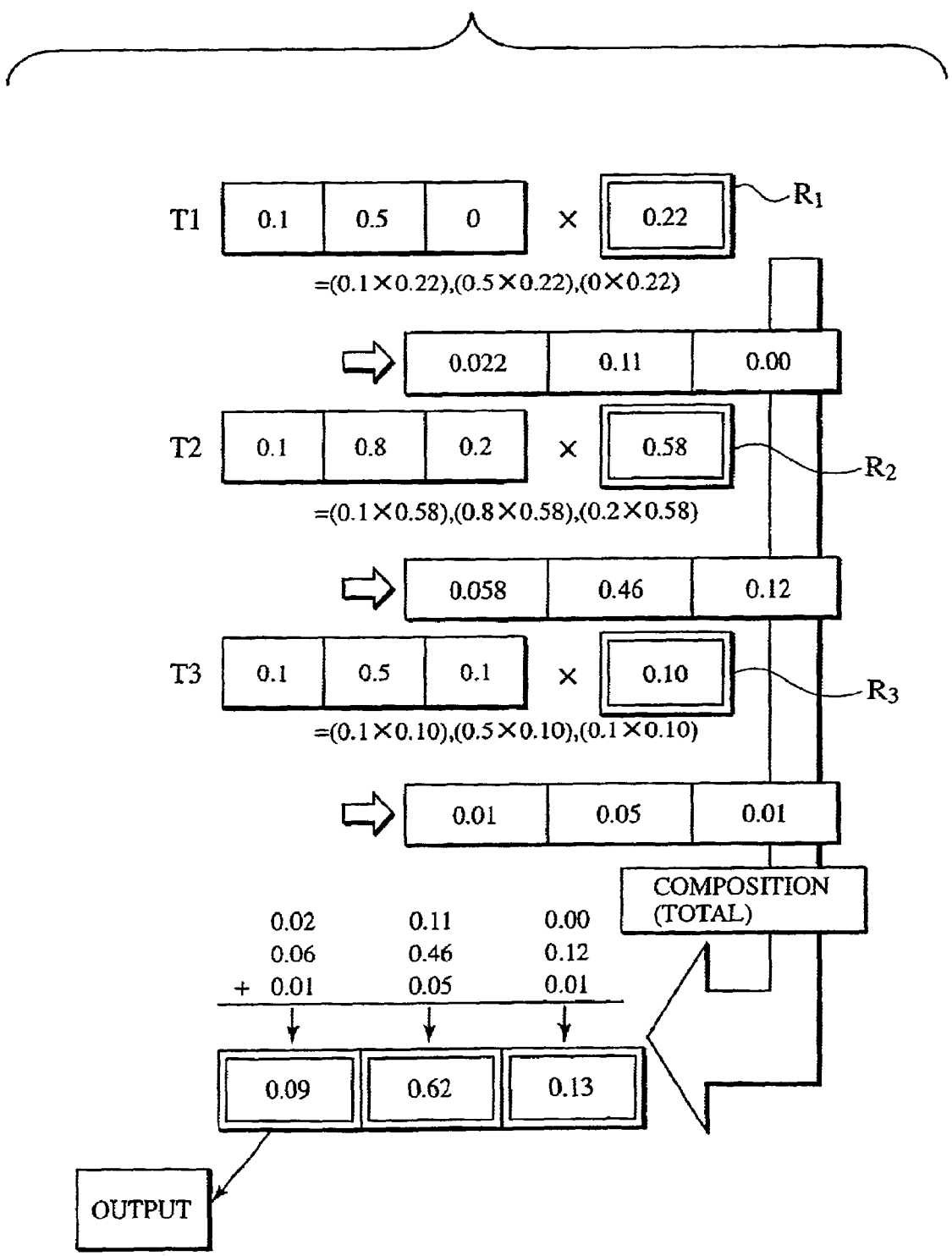
FIG. 7 shows exemplary operation of a composition unit according to the first embodiment.

FIG. 7 shows results of the above processes. The traces T1, T2, and T3 have final activity levels $R(i)$ of 0.22, 0.58, and 0.10, respectively. Each of cell values of $\{0.1, 0.5, 0\}$ of the trace T1 is multiplied by the activity level $R(1)$ of 0.22, to provide cell values of $\{0.022, 0.11, 0.00\}$. Similarly, each of cell values of $\{0.1, 0.8, 0.2\}$ of the trace T2 is multiplied by the activity level $R(2)$ of 0.58, to provide cell values of $\{0.058, 0.46, 0.12\}$. Each of cell values of $\{0.1, 0.5, 0.1\}$ of the trace T3 is multiplied by the activity level $R(3)$ of 0.10, to provide cell values of $\{0.01, 0.05, 0.01\}$.

The cell values of the traces $T(i, j)$ are summed up cell by cell. The resultant cell values may be displayed as final results, or may be fed back to the activity computation unit 5 or the preprocessing unit 3 for further activity and repression processes. This embodiment repeats the feedback operation three times.

Figure 8:
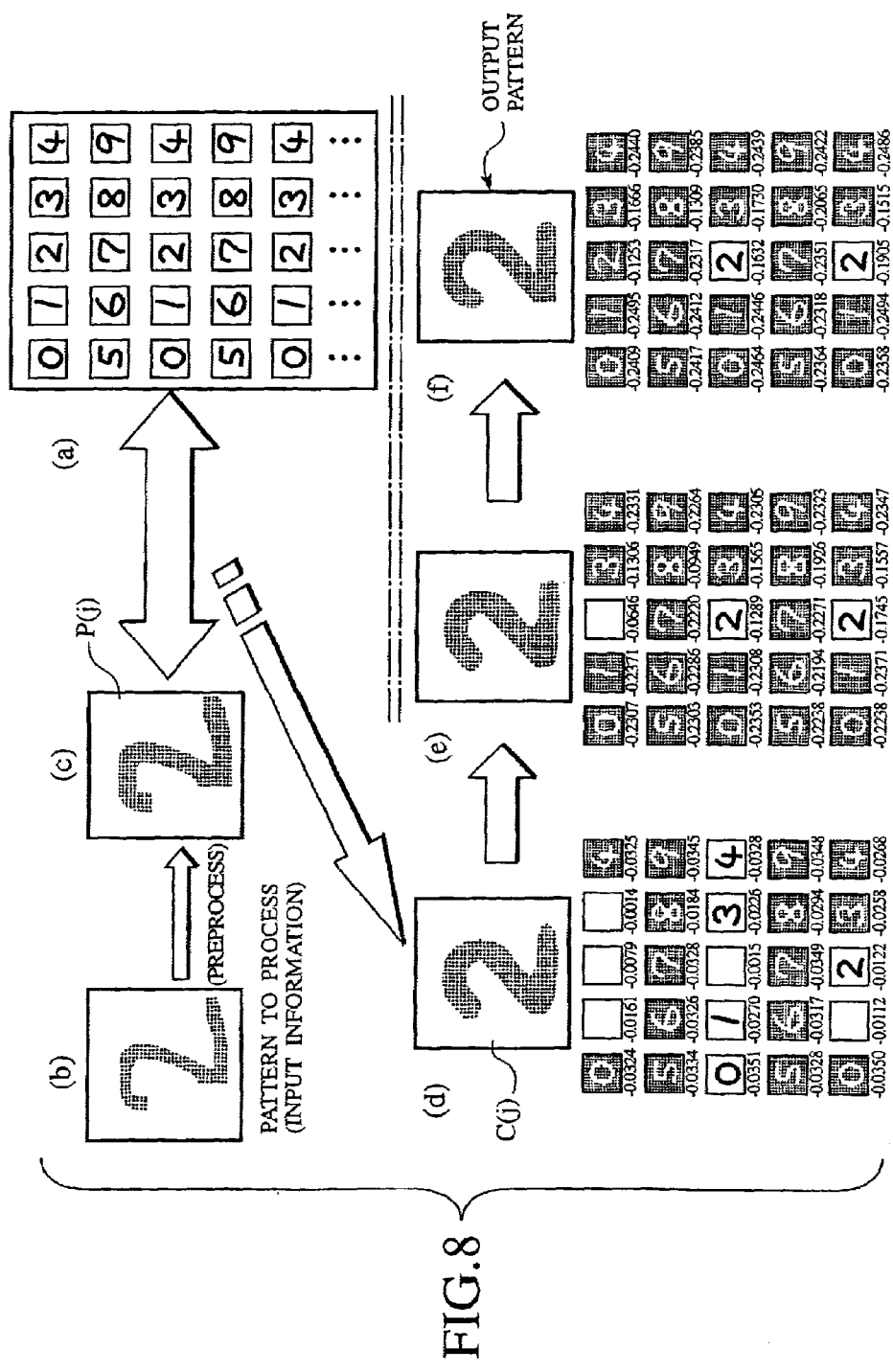
FIG. 8 shows a flow of processes according to the first embodiment.

In one example, the storage unit 4 of the first embodiment stores many numeric characters ranging from 0 to 9 in advance with use of a mouse, as shown in FIG. 8(*a*). Each pattern of the numeric characters includes no data about the numeral the pattern represents such as its character code. In other words, the pattern does not need to include such meaningful data but is optional. It is natural that encoded meaningful data can be also treated as a pattern itself in the procedure of the present invention.

In FIG. 8(*b*), a numeric pattern is entered into the analyzer of the first embodiment with a mouse. The input pattern is preprocessed to provide a preprocessed input pattern $P(j)$ of FIG. 8(*c*). A mutual repression process is carried out between the pattern $P(j)$ and traces $T(i, j)$ stored in the storage unit 4, and a first composite pattern $C(j)$ is created as shown in FIG. 8(*d*).

The first composite pattern $C(j)$ and the preprocessed pattern $P(j)$ of FIG. 8(*c*) are used to prepare a new pattern $P(j)$, which is supplied to the activity computation unit 5. The activity and repression processes are repeated between the new pattern $P(j)$ and the traces $T(i, j)$, to prepare a second composite pattern $C(j)$ of FIG. 8(*e*).

The second composition pattern $C(j)$ and first composition pattern $C(j)$ are used to again prepare a new pattern $P(j)$, which is supplied to the activity computation unit 5. The activity and repression processes are repeated between the new pattern $P(j)$ and the traces $T(i, j)$, to prepare a third composite pattern $C(j)$ of FIG. 8(*f*) serving as a final output pattern.

Although this final output pattern is not found in the storage unit 4, the final output pattern is related to all traces stored in the storage unit 4 because the final output pattern is prepared through the similarity, activity, and mutual repression processes between the input pattern $P(j)$ and the traces stored in the storage unit 4.

For example, if an input pattern of character "2" is entered and if the storage unit 4 stores numeric characters other than "2," the present invention analyzes the input pattern by relating the input pattern to all data stored in the storage unit 4 and provides a final output pattern. The final activity levels 0.22, 0.58, and 0.10 of the traces $T(1)$, $T(2)$, and $T(3)$ of FIG. 7 may be totaled. The total corresponds to a liking, familiarity, or other intensities of basic human sensibility.

Figure 9:
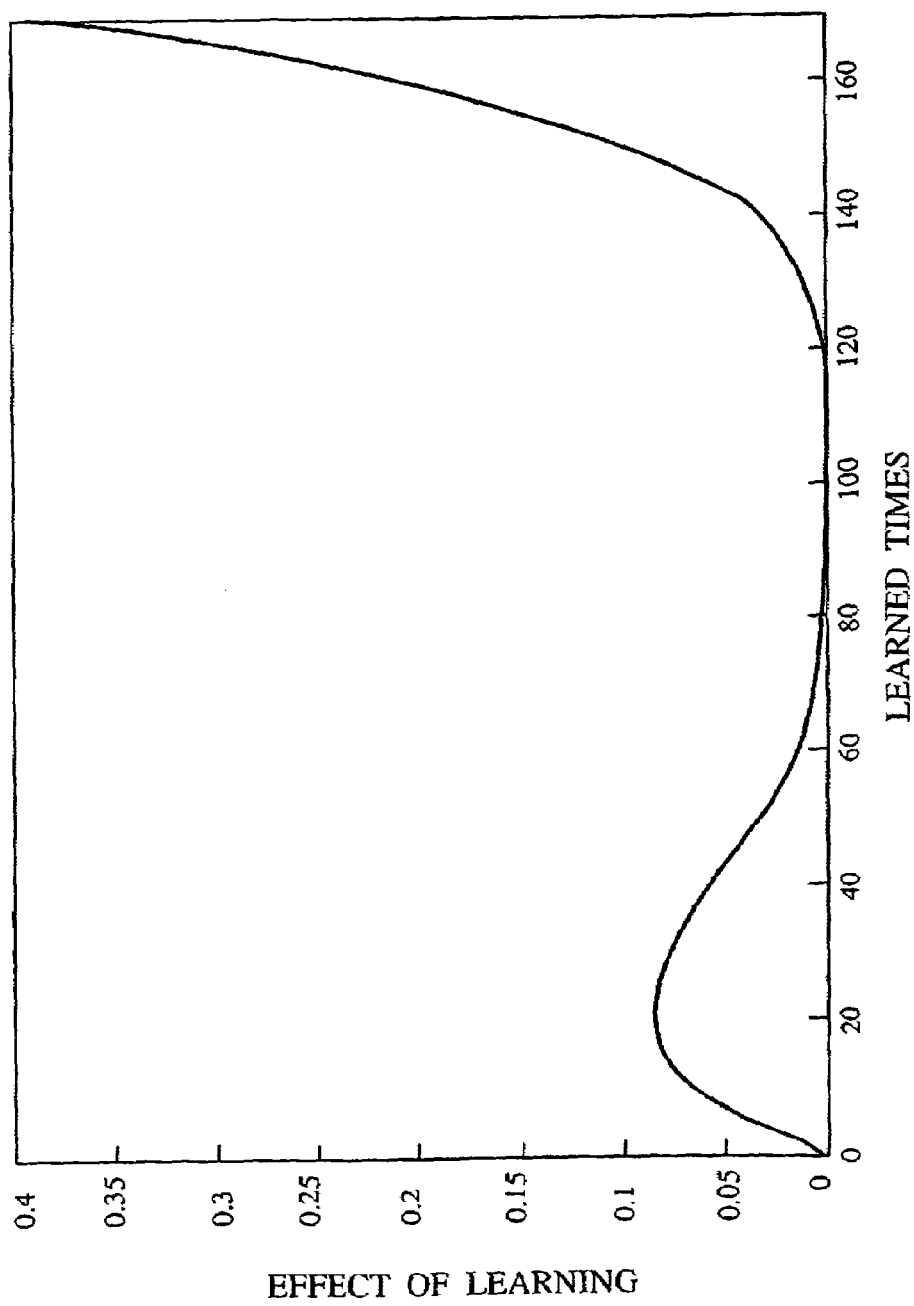
FIG. 9 is a graph showing an effect provided by a collection of traces according to the first embodiment.

FIG. 9 shows a simulation result showing the number of learned times of a given word and corresponding familiarity levels (the strength of a sense that the word has been seen). At the start of the learning of the word, the familiarity improves according to the number of learned times. Thereafter, the familiarity decreases, and then, again increases steeply. The familiarity is the strength of a sense that the word has been seen and corresponds to a human sensibility such as the liking of words.

The present invention handles input information as a unit and is capable of generating a standard pattern from the input and stored information even if the input information is hardly symbolized. Although the first embodiment has been explained in connection with numeric inputs, the present invention is capable of handling any type of input information. For example, the present invention can handle road images shown in FIG. 10.

Figure 10:
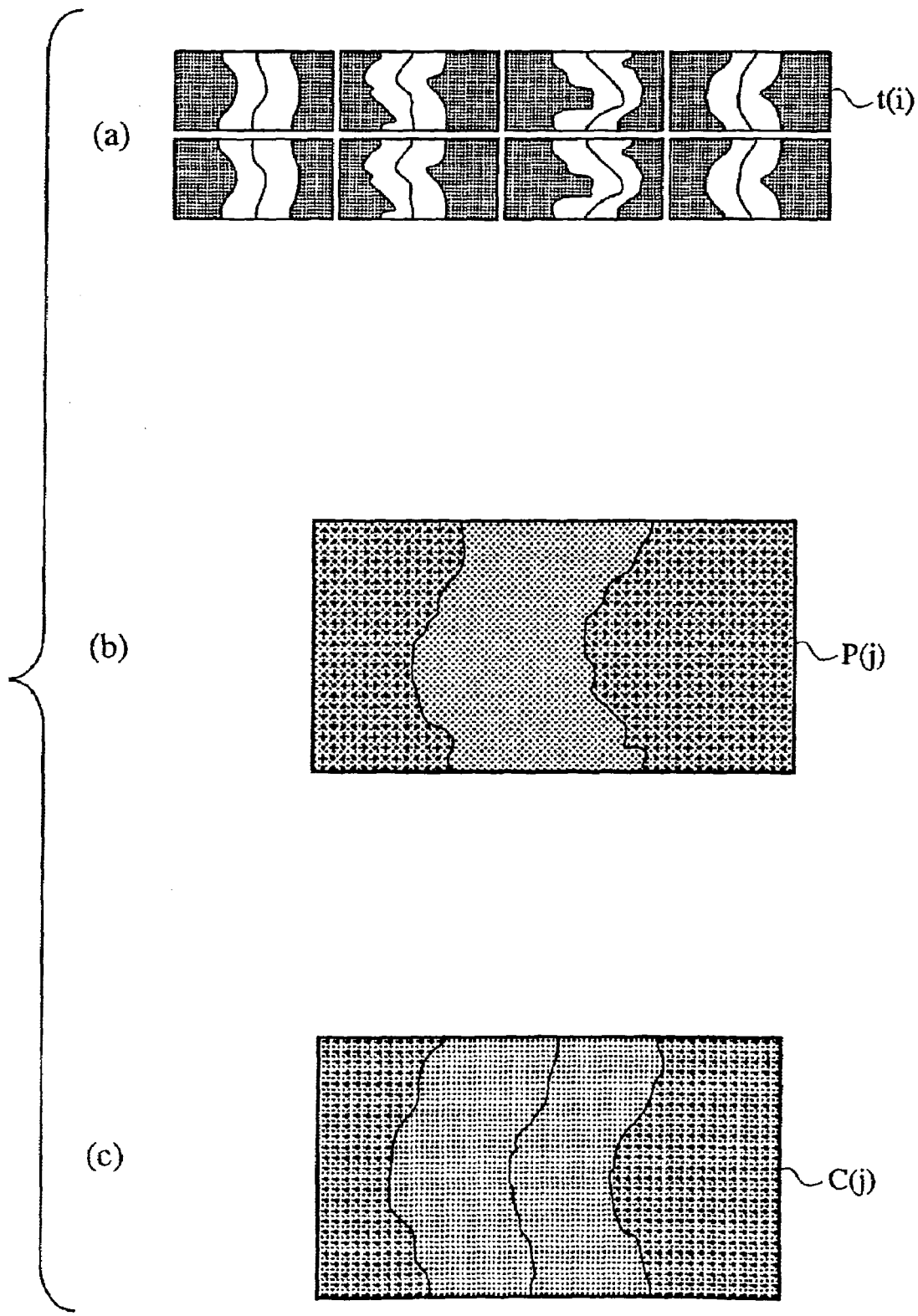
FIG. 10 shows the processing of another type of pattern according to the first embodiment.

FIG. 10 shows a technique of automatically analyzing a path to go through a road. Several road patterns shown in FIG. 10(a) are stored in the storage unit 4 in advance. In each road pattern, left and right shaded parts indicate obstacles, a central white part indicates a road, and a center line indicates a path along which a person may walk by avoiding the obstacles. The road patterns stored in the storage unit 4 include no information other than the patterns themselves. Namely, the present invention requires no rules to calculate intermediate points between the left and right obstacles and draw a path along the intermediate points. The road patterns stored in the storage unit 4 resemble road traces learned by and memorized in a human.

In FIG. 10(b), a new road pattern is drawn with a mouse and entered into the activity computation unit 5 through the input unit 2 and preprocessing unit 3. The entered road pattern corresponds to a new obstacle a person will meet. The road pattern of FIG. 10(b) is stored as a new road pattern in the storage unit 4. The activity computation unit 5 receives the road pattern of FIG. 10(b) as an input pattern $P_C(j)$, and the similarity, activity, and mutual repression processes are carried out between the pattern $P_C(j)$ and the traces t(i) stored in the storage unit 4, to create a composite pattern C(j). The composite pattern C(j) is fed back to the preprocessing unit 3 and activity computation unit 5 several times, to provide a final composite pattern C(j) of FIG. 10(c). In this way, the present invention receives a new road pattern and creates a new path for the received road pattern according to the received road pattern and stored road patterns.

Partial (Cell) Repression Method

A second embodiment of the present invention is based on a partial repression method. Unlike the first embodiment that represses all cells of traces in accordance with the whole of an input pattern P(j), the second embodiment partially activates and represses the cells of traces in accordance with a part of an input pattern P(j). In FIG. 11(a), the second embodiment determines a range {H(j)} around an activated cell in an input pattern P(j) where {H(j)} ⊂ {P(j)}. The range H(j) is a focal range Hj, which is set in each of the input pattern and traces. Around the focal range Hj, the similarity level and activity level of each cell of each trace are calculated and repressed, to provide a final activity level. The final activity level serves as a representative value for the focal range Hj as shown in FIG. 11(b).

The second embodiment determines a focal range Hj containing a set of cells to which a process result is applied and a similarity range, an activity range and a repression range for input information as well as for each trace stored in a storage unit. Each of the similarity, activity, and repression ranges is defined by a distance from the focal range and contains a set of adjacent cells.

A similarity range $H_Sj$ is defined as $Hj \subseteq H_Sj \subseteq \{P(j)\}$, and a similarity level $S_H(i, j)$ is calculated for cells contained in the similarity range $H_Sj$. When calculating a similarity level for a given similarity range, the influence of a cell on the calculation may be decreased in proportion to the distance of the cell from a focal range. On the contrary, the influence of a cell on the calculation may be increased in proportion to the distance of the cell from the focal range. At the minimum, a similarity range consists of a single cell (with a focal range consisting of a single cell), and at the maximum, a similarity range consists of the whole of input information or a trace.

After the calculation of a similarity level for each similarity range, an activity level $A_H(i, j)$ is calculated based on each similarity level. Thereafter, the activity level $A_H(i, j)$ is applied to the value of each cell T(i, j) in an activity range that is defined by a distance from a focal range in each trace, instead of applying the activity level to all cell values of the trace. The activity range is optional and may be equal to the similarity range.

A repression range Ij (Hj ⊆ Ij ⊆ {P(j)}) is defined by a distance from a focal range. Mutual repression $\delta A_H(i, j)$ is applied to cells in the repression range Ij. A repression coefficient applied to a cell in a repression range may be changed according to the distance of the cell from a focal range. After the repression, cell values that overlap one another around focal ranges are summed up to provide a new cell value. As a result, a set of new cell value or a scalar being obtained by summation of the activities will be provided. New structure of pattern or scalar can be also provided, for example, by summing up plurality of cell values within the related focal range to make up one cell value as a new pattern.

Exemplary calculations according to the partial repression method will be explained in connection with the simple model of FIG. 3(a). Adjacent three cells in an input pattern P(j) will be explained. The three cells are L1, L2, and L3 having cell values of P(L1), P(L2), and P(L3). A focal range is made from a single cell, and therefore, there are focal ranges $H_{L1}$, $H_{L2}$, and $H_{L3}$. For the sake of simplicity, there are three traces (M=3) including T1={T(1, j)}={T(1, 1), T(1, 2), ..., T(1, L1), T(1, L2), T(1, L3), ...}, T2={T(2,j)}, and T3={T(3,j)}. The traces T2 and T3 are expressible like the trace T1.

Similarity ranges $H_{SL1}$ and $H_{SL3}$ are defined around the focal ranges $H_{L1}$ and $H_{L3}$, respectively, where $H_{L1} \subseteq H_{SL1}$. The similarity range $H_{SL1}$ contains the adjacent cell L2, i.e., L1, L2 ∈ $H_{SL1}$. Also, the similarity range $H_{SL3}$ contains the adjacent cell L2, i.e., L2, L3 ∈ $H_{SL3}$. The cell L2 is contained in both the similarity ranges $H_{SL1}$ and $H_{SL3}$.

A similarity level $S_H(i, j)$ is calculated for each focal range and for each similarity range $H_Sj$ as follows:

$$S_H(i, k) = \sum_{Lk \in H_S k} P(\kappa) \cdot T(i, \kappa) / N_k. \quad \text{(eq. 7)}$$

The sum total is calculated for all cells L, contained in a given similarity range $H_Sk$ where the number of related cells is $N_k$. For the trace T1, $S_H(1, L1)=\{P(L1)T(1, L1)+P(L2)T(1, L2)+ ...\}/N_{L1}$, and $S_H(1, L3)=\{P(L2)T(1, L2)+P(L3)T(1, L3)+ ...\}/N_{L3}$. Each activity level A(i, j) is calculated as $A_H(i, j)=S_H(i, j)^3$. For example, the focal range $H_{L1}$ (the cell L1) has an activity level of $A_H(1, L1)$.

Three focal ranges for each of the three traces provide nine activity levels, which are repressed to provide final activity levels. Mutual repression is carried out according to Equation 3 among the activity levels $A_H(i, L1)$, $A_H(i, L2)$, and $A_H(i, L3)$ in the same trace, or among the activity levels $A_H(1, Lk)$, $A_H(2, Lk)$, and $A_H(3, Lk)$ whose focal ranges correspond to one another. It is also possible to carry out mutual repression among all activity levels.

A repression range Ij may be set for each cell Lj like the similarity range. In this case, the number of repression ranges is equal to the number of cells for each trace. A repressed activity level $R_H(i, j)=A_H(i, j)+\delta A_H(i, j)$ is applied to each cell value in a corresponding repression range, and corresponding cell values of all traces are summed up to provide a new pattern $C_H(j)$ as follows:

$$C_H(j) = \sum_{i=1}^{M} \sum_{Lk \in Ij} \psi(A_H(i, k)) \cdot T(i, k). \quad (eq. 8)$$

Network of MAN Elements

A third embodiment of the present invention is based on a network made of two- or three-dimensionally connected MAN elements. A MAN element is an element that has a refractory period which starts when the element is activated and in which the element outputs no information. The refractory period continues for a predetermined time or until a predetermined number of impulses are applied to the MAN element. The concept of the MAN element network will ultimately be integrated with UZUME of the first embodiment.

The MAN element network stores a wide variety of information pieces for a long time and realizes the activation and mutual repression functions of UZUME in real time. To achieve this, the MAN element network employs information processing and expressing techniques used by human neurons that transmit binary data, i.e., 0s and 1s to express a variety of information pieces.

Humans keep effects of a wide variety of learned information for a long time due to neuron's expressing ability. To express as many data as possible, the neurons store data as neuron combinations as Hebb contended in a cell assembly theory or a population theory.

A problem is how to model neuron combinations. In humans, there are limitations that neurons that are disjoined from each other are unable to combine together and that neurons involve directivity. For example, information into a receptor such as a retina is directed toward an effector such as the vocal cords. When an impulse is transmitted to a neuron of the vocal cords, this neuron has no direct connection with the retina. To excite the neuron of the vocal cords, preceding neurons must be excited. This means that a combination of a visual cell and a vocal cord neuron has no way to express information because they have no direct connection.

A set of neurons forms a neuron band, a neuron route, or a neuron stream that extends from an input end to an output end, and the number of expressible information pieces by neurons is determined by the number of neuron bands the neurons can form. Present neural network models express information with a neural network as a whole.

An input pattern to a neural network determines a neuron route in the network. It is understood, therefore, that an input pattern is replaceable with a set of neurons in the neural network. This is to express information with a network. The present invention expresses patterns or information pieces with sets of elements that may form many routes.

(A) Branching Problem in Maximizing Neuron Combinations

Figure 17:
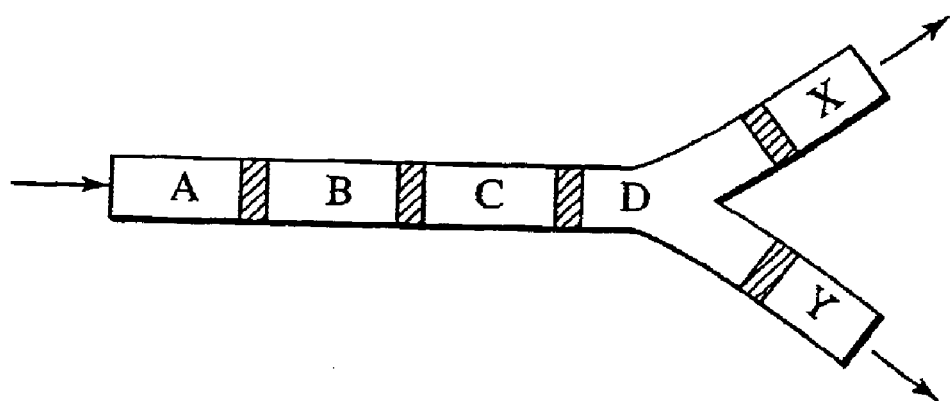
FIG. 17 shows a string of neurons forming a neuron band.

How to maximize neuron band variations will be considered with a simple example. FIG. 17 shows neurons A, B, C, D, X, and Y The neurons A to D are lined from an input end toward an output end, and the neuron D has branches to the neurons X and Y With use of the neurons A to D, X, and Y, expressible information pieces must be maximized. There will be three neuron bands A-B-C-D-X, A-B-C-D-Y, and A-B-C-D-X&Y Upon receiving an impulse, the neuron D must decide whether the impulse must be directed to X, Y, or both X and Y.

If the impulse has a discriminating function, such branching will be realized. Namely, if the impulse is x, then it is oriented toward X. If the impulse is y, then it is oriented toward Y If the impulse is xy, then it is oriented toward both X and Y.

However, the impulse is binary data to represent 0 or 1, and therefore, the neuron D is only capable of transferring the impulse to the neurons X and Y, or nowhere. The branching problem is to find a way to branch an information impulse from the neuron D based on the all-or-none principle.

(B) Are Information Expressing Sources Only Receptor Cell Combinations?

The number of brain cells is huge to form an unlimited number of cell combinations, and it seems that the branching problem is a problem not necessary to solve. However, if each neuron functions to transfer only binary information, the number of expressible information pieces will be limited by the number of combinations of input-end neurons such as of receptors including retinas.

If each neuron only transfers binary information, a set of neurons that follow a receptor neuron forms a neuron band to transfer or not transfer information supplied to the receptor neuron.

The number of such neuron bands is limited by the number of combinations of receptor (input) neurons because each neuron only transfers information or not. Namely, the route of an impulse is determined at an input-end neuron to which the impulse is applied. That is, the same pattern selects the same route.

Human neurons seem to have solved the branching problem. This will be studied. A simple solution is that an impulse selects a shortest distance. The neuron D, for example, has an input end and output ends, which are connected to synapses of the neurons X and Y Among the paths between the input end and the output ends, an impulse to the neuron D selects the shortest one. If the paths are equal, the impulse flows to both the neurons X and Y This solution is applicable only to a neuron having two output ends. This solution transfers no impulse to a farthest one among three or more output ends, and therefore, is unable to maximize the number of neuron combinations.

When the neuron D, which only transfers binary information, determines the destination of an impulse, it will be said that the impulse itself contains information to determine the destination. It will also be said that an impulse to the neuron C that transfers the impulse to the neuron D contains information to determine the destination thereof because the neuron C is unable to determine the destination. This means that an impulse to the first neuron A must contain a key to determine an entire route. With neurons having no discriminating function, the present invention reconsiders the meaning of input information to solve the branching problem.

(C) Time Axis

One idea is to introduce a time axis on input information. Conventionally, input information or an input pattern is grasped as 0s and 1s within an instantaneous unit time. This idea is unable to increase the number of neuron bands.

To increase neuron bands, it is effective to provide input information with data to make a neuron (e.g., the neuron D of FIG. 17) select a path. To achieve this, input information must be enhanced or complicated. Input information may be complicated by introducing a time axis. With the time axis, input information is grasped as a set of binary data (1s and 0s) distributed over a given time. This will solve the branching problem. The branching problem will be solved by introducing the concept of a refractory period.

(D) Refractory Period

The introduction of a time axis becomes useful only when a refractory period is introduced for neurons. If neurons have no refractory period, they simply pass input information through a network.

If a time axis is introduced without refractory period, input information will be a set of identical data arranged along the time axis, and therefore, a set of patterns is transferred and output through specific neuron bands without correlation among the patterns. If the same patterns are continuously provided to a neural network at fixed intervals without correlation among the patterns, neuron bands that transmit the patterns through the network will be monotonous. If an input impulse is passed from one neuron to the next neuron in the same manner, the introduction of a time axis will be useless. In this case, the number of input element combinations determines the number of expressible patterns. Even if the network contains many elements, the number of patterns expressible by the elements is restricted by the number of elements existing at input ends of the network.

To utilize a time axis in handling information, a network must have a mechanism for relating information to the time axis. To achieve this, the present invention employs a refractory period. The refractory period can relate different patterns with one another along a time axis, to express more information. The refractory period provides a finite number of neurons with a temporal dimension to increase expressible information variations.

Figure 18:
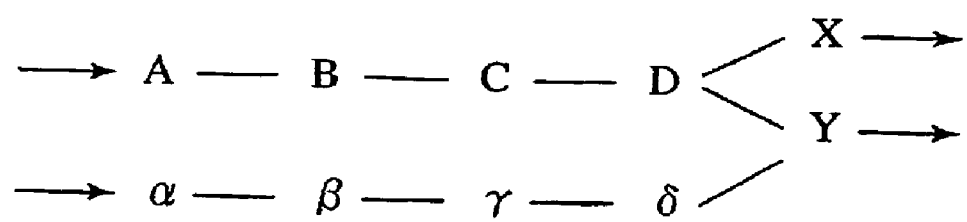
FIG. 18 shows parallel strings of neurons forming neuron bands.

FIG. 18 shows a string of neurons $\alpha$, $\beta$, $\gamma$, and $\delta$ arranged along the neuron string of FIG. 17, where the neuron $\delta$ is connected to the neuron Y In FIG. 18, it is assumed that an impulse transferred to the neuron D through the neurons A to C is passed as it is to the neurons X and Y This, however, does not solve the branching problem. Before the impulse passed through the neurons A to D, it is assumed that an impulse has been transferred to the neuron Y through the neurons $\alpha$ to $\delta$. At this time, a refractory period is applied to the neuron Y so that the neuron Y may ignore input impulses during the refractory period after it passes an impulse.

Namely, after passing the impulse provided through the neurons $\alpha$ to $\delta$, the neuron Y accepts no impulses during the refractory period. If an impulse is transferred to the neuron D through the neurons A to C during the refractory period, the neuron D passes this impulse as it is to the neurons X and Y, and the neuron Y ignores this impulse. As a result, the impulse in question flows only to the neuron X. In this way, introducing the time axis and refractory period solves the branching problem.

If the refractory period provided for the neuron Y is an hour, the neuron Y will be inactive for an hour after receiving the impulse through the neurons $\alpha$ to $\delta$. During the refractory period, all impulses transferred to the neuron D through the neurons A to C are passed only to the neuron X. In this case, it is understood that synapses between the neurons D and Y pass no impulses.

The branching problem between the neurons A to D and the neurons X and Y is solvable by adding the string of neurons $\alpha$ to $\delta$. This is not a simple addition of new expression by an added neuron combination of ABCDXY$\alpha\beta\gamma\delta$. If there is no time axis, the neurons A and $\alpha$ will simultaneously receive impulses. In this case, the input is expressed with the neuron combination of ABCDXY$\alpha\beta\gamma\delta$ and an output is expressed with the neurons X and Y both being excited.

Combining neuron strings will be possible only when a time axis and a refractory period for relating information along the time axis are introduced. Introducing the time axis and refractory period adds an information expressing dimension and increases the number of combinations of neurons.

Unlike the prior art that handles information by accepting or rejecting the information, the refractory period technique is capable of creating new patterns and expressing motions and information changes. The present invention grasps, for example, lines, shapes, colors, and odors as a set of patterns received by receptors in a given time. This corresponds to humans recognizing information pieces as motions.

In addition to the refractory period, there is another technique of complicating input information. This technique divides identical information pieces by time units, and oscillates the divided information pieces in given directions according to given rules. This technique allows a network to express more discriminable information pieces. This technique corresponds to an information conversion function achieved by human eyeballs. Human eyeballs oscillate or make saccade four or five times a second, to complicate visual stimulation.

(E) Method of Storing Information

Introducing a time axis for input information and a time sensitive characteristic such as a refractory period for neurons maximizes neuron combinations to express information. To store information expressed with use of the time axis and refractory period, a network must have a structure to express information and select specific neuron bands.

In such a network, each neuron is provided with characters to change the transmission performance of an impulse and the length of a refractory period in response to an input impulse. For example, a neuron is characterized to more easily transmit an input impulse as the number of impulses to the neuron increases. The refractory period of a neuron may be changed in response to the number of impulses applied to the neuron during the refractory period, or the number of impulses applied to the neuron during a set period without regard to the refractory period.

The refractory period of each MAN element in a MAN element network may be changed in response to input impulses thereto, to store many information pieces in the network. In the MAN element network, changing a refractory period in response to an input pattern results in changing an output pattern that corresponds to the next input pattern. This is equal to storing information in the network.

Extending a refractory period in response to input impulses is equal to extending the temporal width of an output pattern with respect to an input pattern, to elongate a processing time. This, however, greatly increases the information storing capacity of the network because the extended time axis is used to store information.

(F) Refractory Period and Method of Instantaneously Realizing Uzume

To realize UZUME in real time, it is necessary to provide a method of storing many information pieces and a method of instantaneously calculating similarity levels and carrying out mutual repression according to the stored information pieces. One measure to achieve this is to provide an information storing structure with a processing function. This is the generalization of UZUME having activation and mutual repression mechanisms.

UZUME carries out similarity level calculations, mutual repression, and composition according to discrete information sources. Namely, UZUME assumes that all information sources are separately stored. Instantaneously processing all information sources will be difficult if the number of the information sources is large.

Information on which the similarity level calculations, mutual repression, and composition are carried out will be examined. UZUME assumes that every information source has an identical cell structure. The inventor thinks that each cell serving as an information node may have functions of activation, mutual repression, and composition like UZUME, to eliminate the operations of fetching many information pieces and causing interactions among them. To achieve this, processes achieved by UZUME are applied to each cell, unlike the general repression method of UZUME that handles input information as a whole.

For example, the general repression method of UZUME handles a pattern of 32×32 cells as a whole. Instead, the third embodiment handles every cell as a processing target. The third embodiment assumes a set of cells in a given range around a target cell and carries out similarity level calculations, mutual repression, and composition within the range. Namely, the third embodiment processes individual cells, integrates process results into one, and creates an output pattern. Assuming a processing range, carrying out UZUME for the range, and creating an output pattern according to the third embodiment will be explained.

A focal range is a set of cells to which process results are applied. The focal range is set in input information and traces. A similarity range, an activity range, and a repression range include each a set of cells and are each defined by a distance from the focal range.

(G) Cell Repression

(1) Similarity and Activity Levels

A similarity range includes a set of cells and is defined by a distance from a focal range. The similarity level of each cell in the similarity range is calculated. It is possible to employ a rule that a farther cell from the focal range is provided with a smaller similarity level. A smallest similarity range consists of a single cell. In this case, a focal range also consists of a single cell. A largest similarity range consists of the whole of input information, or the whole of each trace.

Once the similarity level of a given similarity range is calculated, an activity level is calculated accordingly. All cell values of each trace are multiplied by the activity level, or alternatively, cell values in an activity range defined by a distance from the focal range are multiplied by the activity level.

(2) Mutual Repression

A repression range is defined by a distance from the focal range, and a repression coefficient is applied to cells in the repression range. The repression coefficient may be changed according to the distance from the focal range.

(3) Composition

After the mutual repression, cell values are summed up through corresponding focal ranges.

(H) Information Processing by MAN Element Network

Information expression by network (neuron bands) is applied to the activity, repression, and composition ranges. Calculating the similarity level of every trace with respect to input information corresponds to specifying a neuron band representing the input information among similar neuron bands. A MAN element transfers an input impulse to the next element on the output side thereof, to activate one of similar neuron bands that start from the MAN element.

A neuron band starting from a specific element is defined by an impulse provided by the element. Namely, similar neuron bands are activated and dissimilar neuron bands are not activated.

Patterns successively supplied to an element are subjected to a refractory period specific to the element. If a first pattern activates a given element and if a second pattern that is similar to the first pattern is provided, the given element activated by the first pattern will not be activated by the second pattern. This prevents the identification of a neuron band starting from the given element.

When a pattern a' resembling a stored pattern a is provided, a neuron band corresponding to the pattern a' is specified, and at the same time, other neuron bands are suppressed depending on their similarity levels with respect to the specified neuron band, due to refractory periods.

An activity range according to the partial repression method is substantially on the output side of a MAN element, and a repression range is substantially on the input side of a MAN element.

In other words, the MAN elements provide pattern information with a depth, i.e., a time axis and carry out mutual repression in connection with the depth. Each MAN element employs a repression rule to restrict transmitting the succeeding inputs to the next element until predetermined conditions are met. The refractory period of an element is affected by the path of an impulse to the element, i.e., by another neuron band or pattern. This means that each impulse contains the influence of patterns. Changing the refractory period conditions of an element in response to an input impulse means to store pattern information.

Accordingly, the MAN elements are capable of carrying out repression. Namely, the MAN elements having refractory periods are capable of carrying out the activity, mutual repression, and composition processes of UZUME.

(I) Information Processing by Single MAN Element

Figure 15:
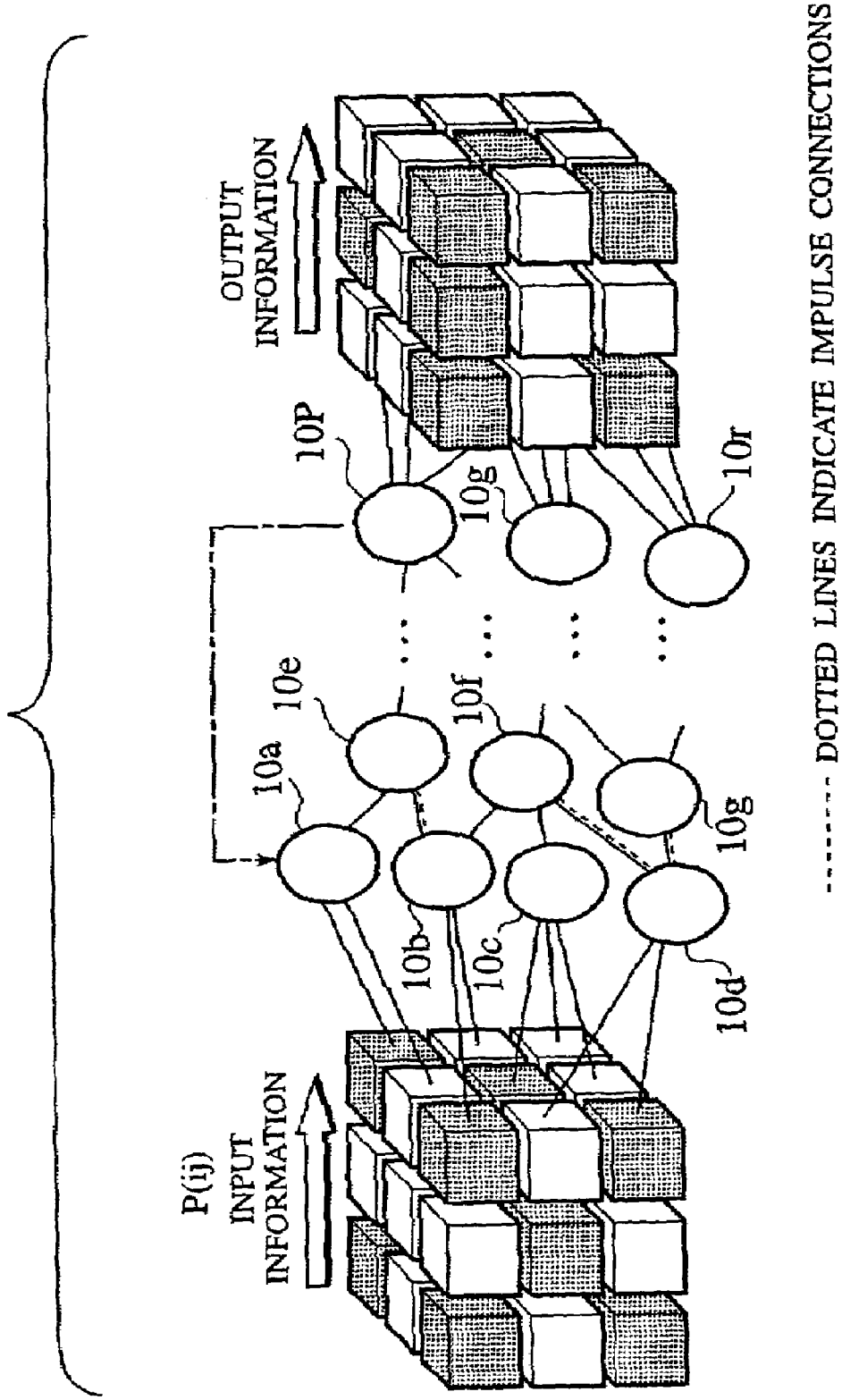
FIG. 15 shows a network of MAN elements according to the third embodiment.
Figure 19:
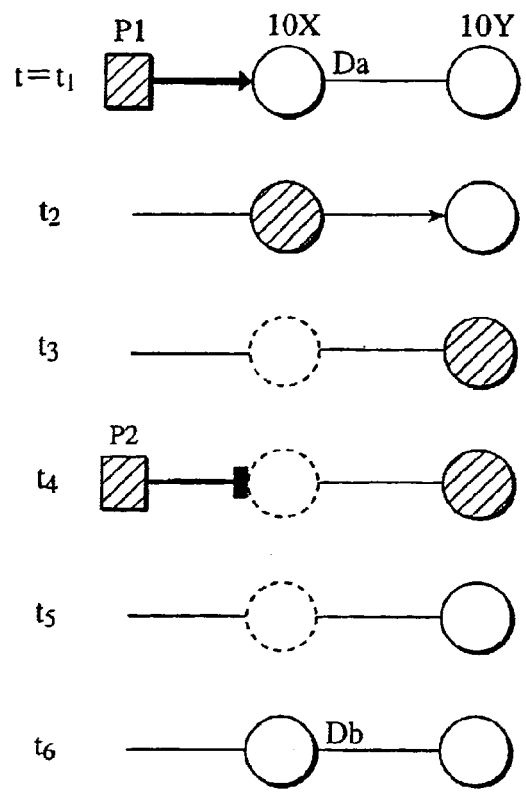
FIG. 19 explains information processes by MAN elements.

FIG. 19 shows MAN element functions corresponding to the similarity and activity level calculations, mutual repression, composition, and pattern storing of the general repression method and partial repression method. In FIG. 19, elements 10x and 10y are adjacent to each other in a network (FIG. 15). The elements 10x and 10y receive input patterns P1 and P2 and change their states according to time points t1 to t6. The patterns P1 and P2 are 0–1 patterns and each contains pattern information expressed by a route reaching the element 10x. As explained above, the pattern information indicates when a corresponding impulse arrives at which element.

At t1, the pattern P1 activates the element 10x. At t2, the element 10x activates the element 10y that is spatially connected to the element 10x. At this time, the elements 10x and 10y are each not in a refractory period. At t3, the element 10x enters a refractory period. The activation and entering into the refractory period of the element 10x are not always determined by the pattern P1. They may be determined by an input from another element. For example, an element that represents a similar spatial pattern may influence the activation and mutual repression of the element 10x. This corresponds to changing the activity and repression levels of a cell depending on the distance from a focal range.

If the element 10x that enters the refractory period at t3 receives the pattern P2, the element 10x does not accept the pattern P2 during the refractory period. This means that the pattern P2 is repressed by the pattern P1 and the state of the element 10x. The fact that the pattern P2 is directed to the element 10x into which the pattern P1 has entered indicates that the patterns P1 and P2 are similar patterns. The fact that the pattern P2 advances toward the element 10x at t4 corresponds to the calculation (activation) of the similarity and activity levels of the patterns P1 and P2. Providing an impulse from the element 10x to the element 10y through these processes is equal to providing a new pattern.

Namely, the single MAN element 10x functions at t4 to carry out activation, mutual repression, pattern composition, and pattern output.

The element 10x that entered the refractory period due to the pattern P1 transfers no impulse due to the pattern P2 to the element 10y. This state continues at t5 and reaches t6. In this example, the element 10y has no refractory period.

It is possible to change the refractory period of the element 10x between t1 and t6. The entered pattern P1 influences the refractory period. The element 10x is capable of representing pattern information and storing data about the number of times the pattern information represented by the element 10x has been entered.

The refractory period of an element may be determined not only by the conditions of the element itself but also by a distance between elements, the shape or size of the element, the conductivity of the element, etc. Adding new elements greatly improves the possibility of activation or repression, to greatly change network functions as will be understood by persons skilled in the art. The refractory period of an element may be changed, for example, on receiving an impulse, on outputting an impulse, during the refractory period, on receiving a new impulse during the refractory period, on receiving a predetermined number of impulses.

The general repression method and partial repression method assume that patterns are discretely stored. On the other hand, the MAN element network of this embodiment stores patterns as network structures by linking the activity levels, repression coefficients, etc., of the patterns.

Configuring MAN Element Network

Figure 12:
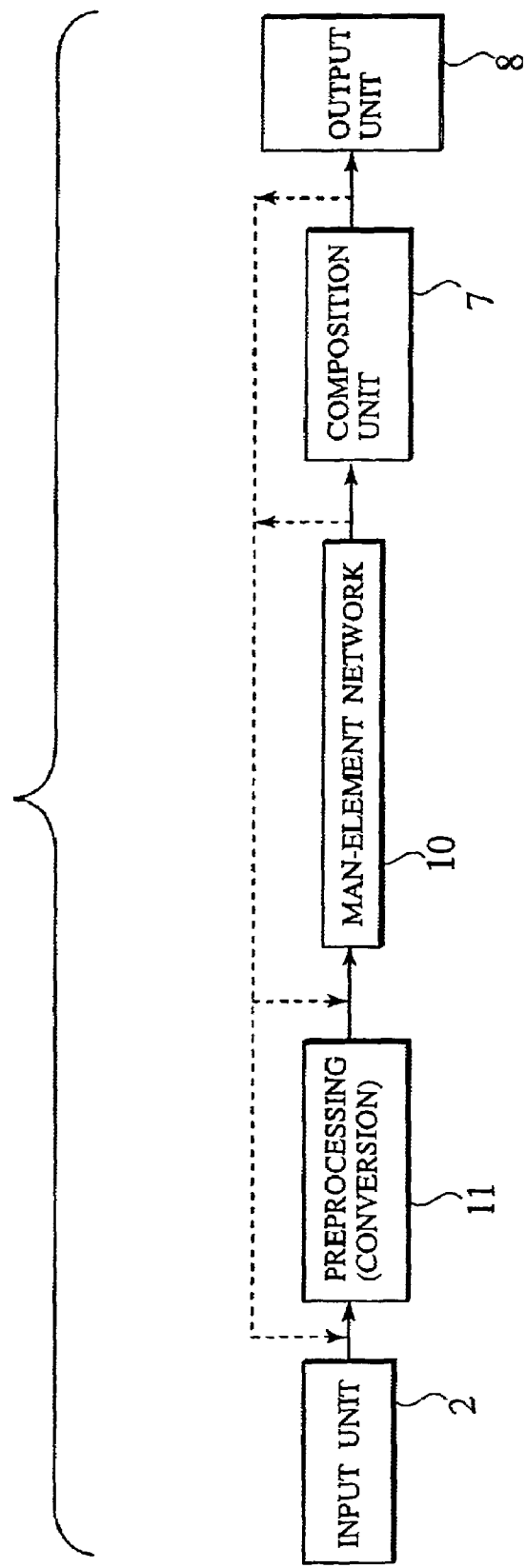
FIG. 12 schematically shows an apparatus for forming patterns from input information according to a third embodiment of the present invention.

FIG. 12 shows a MAN element network according to the third embodiment of the present invention. Each MAN element transmits binary impulse information. Namely, a MAN element transfers an input impulse from an input end to an output end thereof and has a refractory period that changes in response to an input impulse. The MAN element network of the third embodiment is a three-dimensional network of such MAN elements.

Figure 14:
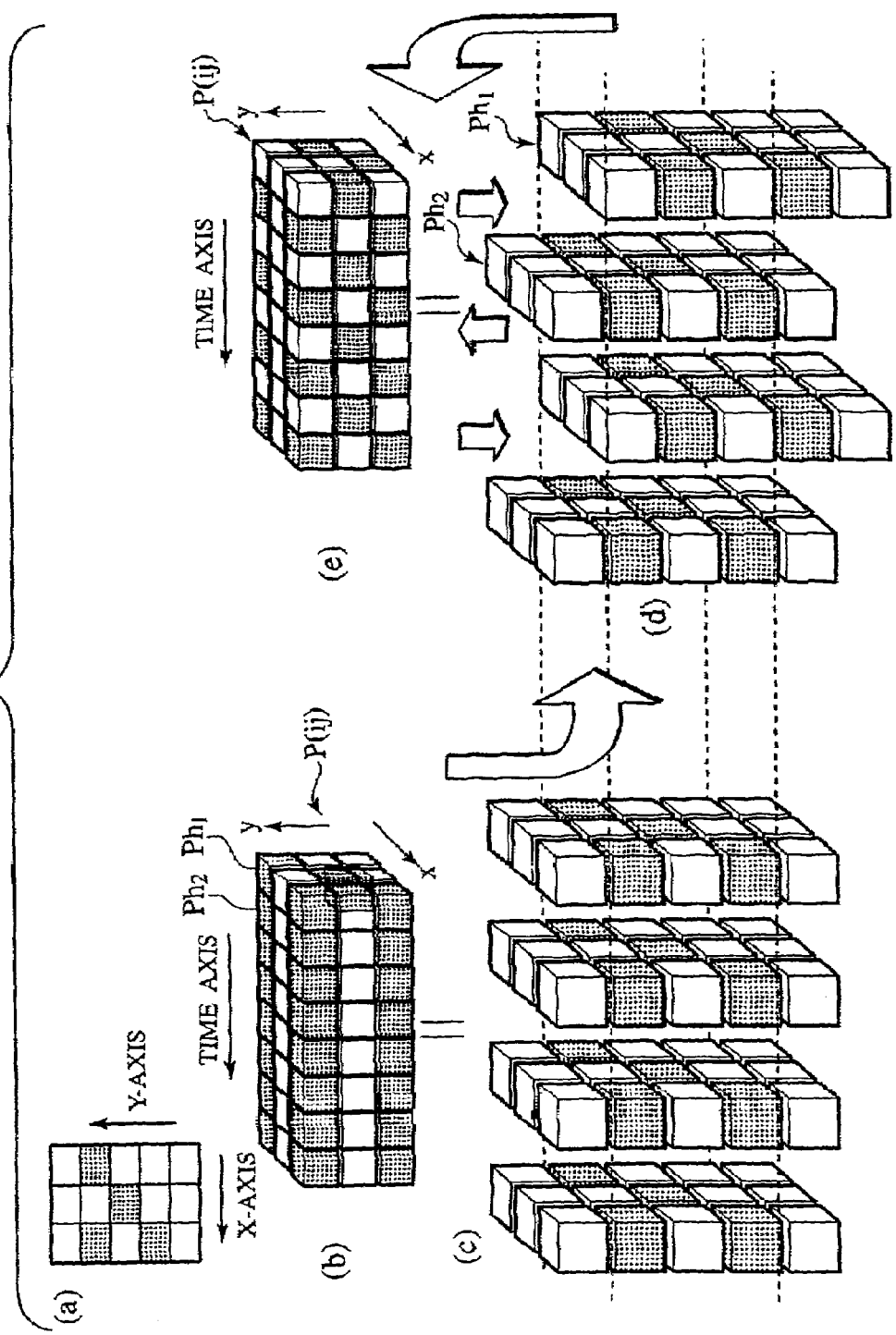
FIG. 14 shows a preprocessing operation according to the third embodiment.

A preprocessing unit 11 carries out the below-mentioned processes instead of Gaussian filtering and shifting. FIG. 14 shows processes carried out by the preprocessing unit 11 of the third embodiment. FIG. 14(a) shows a plane pattern P1(i) continuously provided over a given period from an input unit 2 to the preprocessing unit 11. The preprocessing unit 11 accumulates the input patterns P1(i) along a time axis as shown in FIG. 14(b). This results in forming a set of patterns P(i, j, z) having a depth in the direction Z, i.e., the temporal direction. The patterns P(i, j, z) are divided into blocks Phz in the direction Z as shown in FIG. 14(c). The blocks Phz are alternately shifted (oscillated) in the directions of, for example, ±Y by one cell as shown in FIG. 14(d), and the shifted blocks are combined as shown in FIG. 14(e). The patterns of FIG. 14(e) are entered as input patterns $P_C(i, j)$ into the MAN element network 10.

Figure 13:
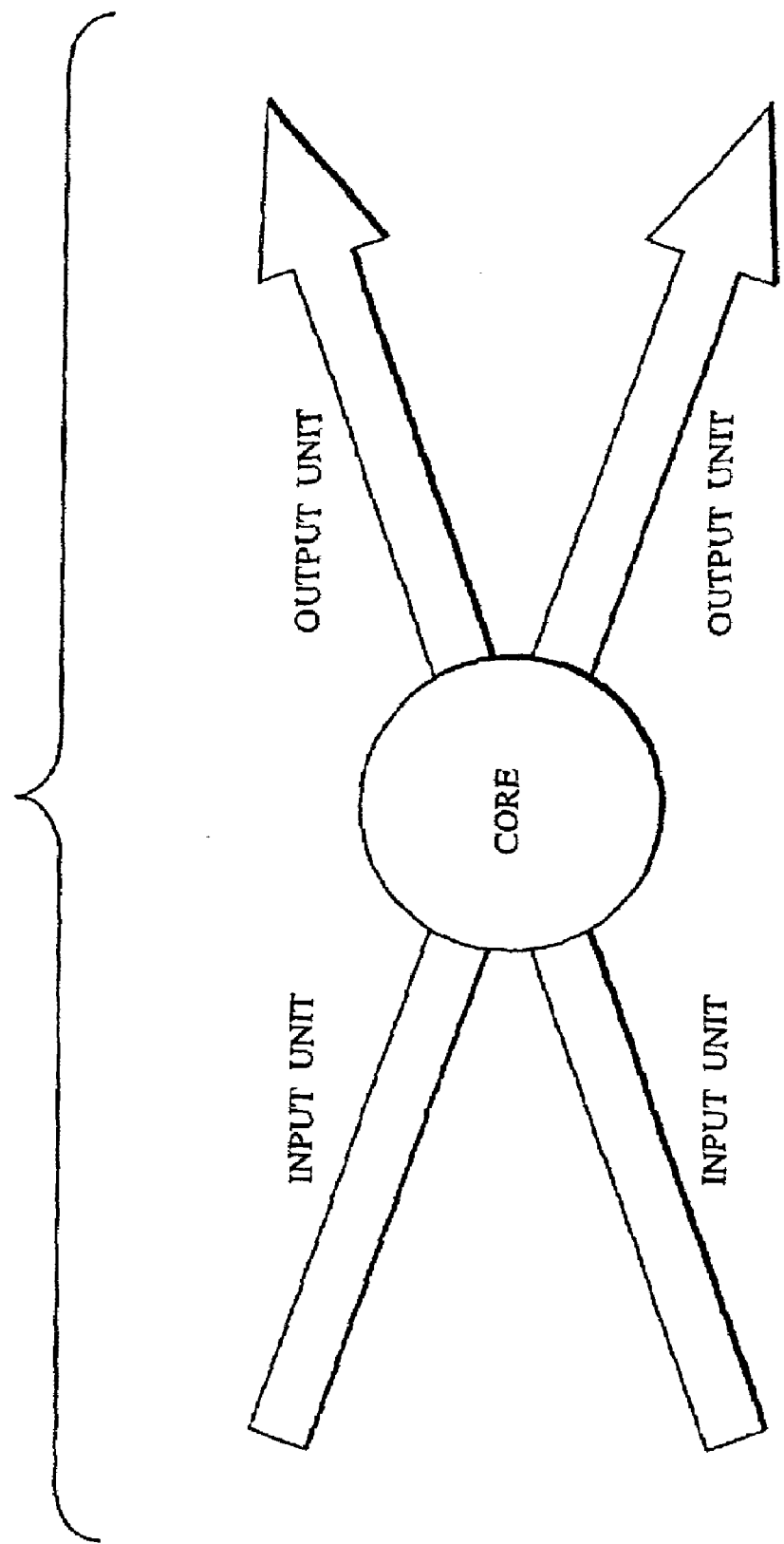
FIG. 13 shows a concept of a MAN element according to the third embodiment.

FIG. 15 explains the operation of the MAN element network 10. The MAN element network 10 consists of MAN elements 10a, 10b, . . . linked with one another. As explained with reference to FIG. 13, each MAN element transmits binary impulse information and consists of input ends, a core, and output ends. Upon receiving impulses at the two input ends, the MAN element passes the impulses through the core to the two output ends. The numbers of the input and output ends are not limited to each two. They are optional. If a MAN element receives an impulse and if given conditions are met, the MAN element transmits the impulse to the next element and changes the state thereof. In this way, routes of the network store information.

In FIG. 15, different input patterns $P_C(i, j)$ are entered into the MAN element network. MAN elements in the first column receive input pattern cells, which activate a predetermined range of information expressed by and stored in the network. At the same time, the input data represses the next input for a predetermined range from the first column cells and forms a new output.

Then, MAN elements in the second column receive the outputs of the first column elements, activate elements in a proximate range, repress the next input information over a proximate range, and form a new output.

Figure 16:
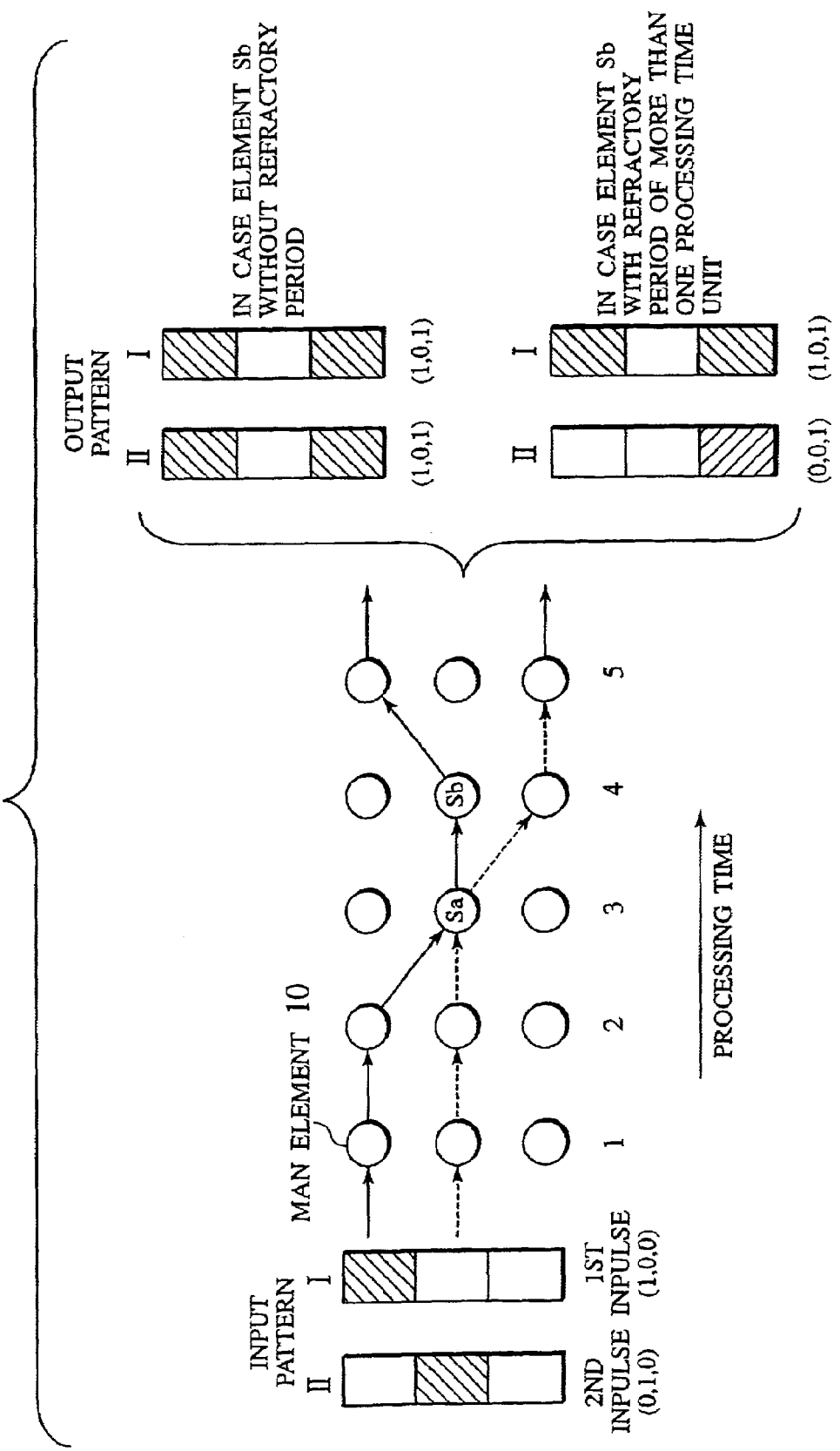
FIG. 16 shows the creation of routes in the MAN element network of the third embodiment.

These processes are repeated up to the last column of MAN elements. The final result may be fed back to the preceding MAN elements. As explained above, the MAN element network 10 consists of MAN elements that are linked with one another as shown in FIG. 16. When an impulse is supplied to the network, the MAN element that is activated by the impulse determines the next element to receive the impulse. This process is repeated up to the MEN elements in the last column. Information transmission routes formed by the MAN elements and changes in the refractory periods of the MAN elements form state patterns and store information corresponding to input information.

The output pattern from the last column of MAN elements is provided from the output unit 8 via the pattern/scalar composition unit 7 without any composition procedure. Furthermore, the composed pattern or scalar data can be also provided by composition process such as summation of output patterns within a given time range and/or a given spatial range according to a predetermined rule.

FIG. 16 shows a model of a MAN element network consisting of MAN elements arranged in three rows and five columns. Impulses are supplied to the network from the left side of the drawing and are transmitted to the right side at unit intervals. For example, a first impulse forms a pattern of (1, 0, 0). An information link between a MAN element Sb in the second row and fourth column and a MAN element Sa that is in front of the element Sa will be considered. In response to the first impulse, the element Sa provides outputs to the element Sb and an element in the third row and fourth column, to finally create an output pattern of (1, 0, 1).

If the element Sb has no refractory period, a second impulse passes through the same routs from the element Sa, to create the same output pattern of (1, 0, 1). If the element Sb has a refractory period, the element Sb does not respond to the second impulse, and therefore, the second impulse is passed through only the other route, to crease a different output pattern of (0, 0, 1), which is a state pattern corresponding to the input information.

Output patterns corresponding to input patterns may be collected along a time axis into an output pattern having no temporal information. For example, the two output patterns corresponding to the input pulses mentioned above may be added to each other to provide an output pattern of (2, 0, 2) with the element Sb having no refractory period, or an output pattern of (1, 0, 2) with the element Sb having a refractory period. In this way, this embodiment is capable of instantaneously analyzing different information pieces and storing analysis results in MAN elements for a predetermined time.

Although the embodiments enter information with a mouse, it is possible to use a digital camera for the same purpose. The embodiments of the present invention are applicable to recognition apparatuses, designing, pattern recognition, sensing (familiarity and liking), etc.

As explained above, the present invention provides an input information analyzing method and apparatus capable of finding similarity levels of stored patterns with respect to an input pattern, calculating the correlation levels or activity levels of the stored patterns, and calculating given times new activity levels A(i) according to the calculated activity levels and a negative repression coefficient. The final activity levels are used to calculate cell values of a new pattern. Like humans, the present invention creates a new pattern according to input and stored patterns.

The present invention also provides a method of creating patterns based on input information. The method employs a network of elements that are three-dimensionally linked with one another at predetermined intervals. The method collects input patterns, divides the collected input patterns into blocks, shifts the blocks in predetermined directions, and combines the shifted blocks as new input patterns to the network. The method is capable of processing many input patterns like humans.

What is claimed is:

1. A method of analyzing input information, comprising the steps of:
    converting an input pattern consisting of cells into a converted pattern consisting of cells and storing the converted pattern;
    calculating an activity level of a partial or whole set of cells of at least one of a plurality of stored patterns with respect to the converted pattern according to cell values of the stored patterns and the converted pattern;
    repressing each of the calculated activity levels a predetermined number of times according to repression rules that are determined in consideration of a negative repression coefficient and the calculated activity levels of the stored patterns other than the converted pattern;
    generating a new cell value for each cell of the at least one stored pattern according to a corresponding one of the cell values and a corresponding one of the repressed calculated activity levels; and
    providing resultant cell values based on the new cell values as a response pattern for the input pattern,
    wherein the repressing step changes each activity level A(i) by δA(i) according to a repression coefficient W(i) as follows:

$$\delta A(i) = W(i)\{\psi(A(1)) + \psi(A(2)) + \ldots + \psi(A(i-1)) + \psi(A(i+1)) + \ldots + \psi(A(M))\}, \text{ and}$$

$$\psi(x) = \begin{cases} x & : x > 0 \\ 0 & : \text{else.} \end{cases}$$

2. An apparatus for analyzing input information, comprising:
    preprocessing means for converting an input pattern consisting of cells into a converted pattern consisting of cells and storing the converted pattern;
    activity level calculating means for reading at least one of a plurality of stored patterns and calculating an activity level of a partial or whole set of cells of each of the read patterns according to cell values of the read patterns and the converted pattern;
    mutual repressing means for repressing each of the calculated activity levels a predetermined number of times according to repression rules that are determined in consideration of a negative repression coefficient and the calculated activity levels of the read patterns other than the converted pattern;
    generating a new cell value for each cell of the at least one stored pattern according to a corresponding one of the cell values and a corresponding one of the repressed calculated activity levels; and
    output means for providing resultant cell values based on the new cell values as a response pattern for the input pattern,
    wherein the mutual repressing means changes each activity level A(i) by δA(i) according to a repression coefficient W(i) as follows:

$$\delta A(i) = W(i)\{\psi(A(1)) + \psi(A(2)) + \ldots + \psi(A(i-1)) + \psi(A(i+1)) + \ldots + \psi(A(M))\}, \text{ and}$$

$$\psi(x) = \begin{cases} x & : x > 0 \\ 0 & : \text{else.} \end{cases}$$

3. A method of analyzing input information, comprising the steps of:
    converting an input pattern consisting of cells into a converted pattern consisting of cells and storing the converted pattern;
    calculating an activity level of a partial or whole set of cells of at least one of a plurality of stored patterns with respect to the converted pattern according to cell values of the stored patterns and the converted pattern;
    repressing each of the calculated activity levels a predetermined number of times according to repression rules that are determined in consideration of a negative repression coefficient and the calculated activity levels of the stored patterns other than the converted pattern;
    generating a new cell value for each cell of the at least one stored pattern according to a corresponding one of the cell values and a corresponding one of the repressed calculated activity levels; and
    providing resultant cell values based on the new cell values as a response pattern for the input pattern,
    wherein one of a plurality of similarity levels of the cells for a focal range of one cell of the partial or whole set of cells is calculated as follows:

$$S_H(i,k) = \sum_{Lk \in H_{\delta}k} P(\kappa) \cdot T(i,\kappa)/N\kappa.$$

wherein $S_H(i,k)$ represents the similarity level, $L_k$ represents a cell contained in a given similarity range $H_{sk}$, $P(k)$ represents a cell value in the input pattern, $T(i,k)$ represents a cell value in trace i, and $N_k$ represents a number of related cells.

4. The method of claim 3,
wherein a repression range is set for the focal range and a new pattern is calculated as follows:

$$C_H(j) = \sum_{i=1}^{M} \sum_{Lk \in Ij} \psi(A_H(i,k)) \cdot T(i,k).$$

wherein $C_H(j)$ represents the new pattern, $L_k$ represents a cell contained in a given repression range $I_j$, $A_H(i,k)$ represents an activity level of a cell k in trace i, $T(i,k)$ represents a cell value in trace i, and $$\psi(x) = \begin{cases} x & : x > 0 \\ 0 & : \text{else.} \end{cases}$$

5. A method of analyzing input information, comprising the steps of:

converting an input pattern consisting of cells into a converted pattern consisting of cells and storing the converted pattern;

calculating a similarity level of a cell in a similarity range containing a focal range of one cell of a partial or whole set of cells of at least one of a plurality of stored patterns with respect to the converted pattern according to cell values of the stored patterns and the converted pattern;

calculating an activity level of the partial or whole set of cells;

repressing each of the calculated activity levels a predetermined number of times according to repression rules that are determined in consideration of a negative repression coefficient and the calculated activity levels of the stored patterns other than the converted pattern;

generating a new cell value for each cell of the at least one stored pattern according to a corresponding one of the cell values and a corresponding one of the repressed calculated activity levels; and providing resultant cell values based on the new cell values as a response pattern for the input pattern.

6. The method of claim 5, wherein the similarity level of the cell in the similarity range depends on a distance from the focal range to the cell in the similarity range.

7. The method of claim 5,
wherein a repression coefficient applied to a cell in a repression range containing the focal range depends on a distance from the focal range to the cell in the repression range.

* * * * *